United States Patent
Ito

(10) Patent No.: US 10,884,286 B2
(45) Date of Patent: Jan. 5, 2021

(54) ELECTRO-OPTICAL DEVICE, METHOD FOR MANUFACTURING ELECTRO-OPTICAL DEVICE, AND MEMBER FOR MANUFACTURING ELECTRO-OPTICAL DEVICE

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/663,475

(22) Filed: Oct. 25, 2019

(65) Prior Publication Data
US 2020/0133056 A1 Apr. 30, 2020

(30) Foreign Application Priority Data
Oct. 26, 2018 (JP) .................... 2018-201478

(51) Int. Cl.
*G02F 1/1335* (2006.01)
*G02F 1/1343* (2006.01)
(Continued)

(52) U.S. Cl.
CPC ..... *G02F 1/133526* (2013.01); *G02B 3/0012* (2013.01); *G02B 3/0075* (2013.01);
(Continued)

(58) Field of Classification Search
CPC .......... G02F 1/133526; G02F 1/13439; G02F 1/133345; G02B 3/0075; G02B 27/0955; G02B 3/0012
(Continued)

(56) References Cited

U.S. PATENT DOCUMENTS

2006/0215269 A1 * 9/2006 Abe ..................... G02B 3/0012
359/619
2009/0212011 A1 8/2009 Abe et al.
(Continued)

FOREIGN PATENT DOCUMENTS

JP 2006-332314 A 12/2006
JP 2010-002925 A 1/2010
(Continued)

*Primary Examiner* — Charles S Chang
(74) *Attorney, Agent, or Firm* — Oliff PLC

(57) ABSTRACT

An electro-optical device includes a transmissive substrate, a lens surface, a transmissive lens layer, an optical path adjustment layer that adjusts an optical path length of light passing through the lens surface, a wiring layer that includes a transmissive light transmitting portion and a wiring portion including wiring and that is disposed in contact with the optical path adjustment layer on an opposite side of the optical path adjustment layer from the lens layer, a transmissive pixel electrode disposed on an opposite side of the wiring layer from the optical path adjustment layer and overlapping the light transmitting portion in plan view, a first mark disposed between the substrate and the optical path adjustment layer and being in contact with the substrate, and a second mark disposed between the optical path adjustment layer and the wiring layer and being in contact with the optical path adjustment layer.

10 Claims, 15 Drawing Sheets

(51) Int. Cl.
    *G02B 3/00*      (2006.01)
    *G02B 27/09*     (2006.01)
    *G02F 1/1333*    (2006.01)

(52) U.S. Cl.
    CPC ..... *G02B 27/0955* (2013.01); *G02F 1/13439* (2013.01); *G02F 1/133345* (2013.01)

(58) Field of Classification Search
    USPC .......................................................... 349/95
    See application file for complete search history.

(56) References Cited

U.S. PATENT DOCUMENTS

| | | |
|---|---|---|
| 2015/0041833 A1 | 2/2015 | Nimura |
| 2015/0331280 A1* | 11/2015 | Wakabayashi ........ G02F 1/1339 349/57 |
| 2017/0082893 A1 | 3/2017 | Ito |
| 2018/0173048 A1* | 6/2018 | Ito ........................ G02F 1/13306 |

FOREIGN PATENT DOCUMENTS

| | | | |
|---|---|---|---|
| JP | 2014-089231 A | 5/2014 |
| JP | 2014-092601 A | 5/2014 |
| JP | 2015-034860 A | 2/2015 |
| JP | 2015-049468 A | 3/2015 |
| JP | 2015-200766 A | 11/2015 |
| JP | 2016-224459 A | 12/2016 |
| JP | 2017-058537 A | 3/2017 |

* cited by examiner

ELECTRO-OPTICAL DEVICE, METHOD FOR MANUFACTURING ELECTRO-OPTICAL DEVICE, AND MEMBER FOR MANUFACTURING ELECTRO-OPTICAL DEVICE

The present application is based on, and claims priority from JP Application Serial Number 2018-201478, filed Oct. 26, 2018, the disclosure of which is hereby incorporated by reference herein in its entirety.

BACKGROUND

1. Technical Field

The disclosure relates to an electro-optical device, a manufacturing method of an electro-optical device, and a member for manufacturing an electro-optical device.

2. Related Art

An electro-optical device, such as a liquid crystal device, is used for an electronic device, such as a projector. JP 2017-58537 A discloses an electro-optical device including an element substrate, a counter substrate, and a liquid crystal disposed therebetween.

The element substrate disclosed in JP 2017-58537 A includes a transmissive substrate in which a lens surface is formed, a transmissive lens layer covering the lens surface, a protective layer disposed at the lens layer, a pixel electrode overlapping in plan view with the lens surface, and a wiring layer disposed between the protective layer and the pixel electrode. The wiring layer includes a light transmission region that overlaps the pixel electrodes in plan view, and a light shielding region that includes wiring or the like and surrounds the light transmission region in plan view. In the element substrate disclosed in JP 2017-58537 A, as a result of including the lens surface, light entering the pixel electrode through the light transmission region can be increased.

However, in the element substrate disclosed in JP 2017-58537 A, for example, when attempting to increase the optical path length by increasing the thickness of the protective layer to cause a condensing position of the light passing through the lens surface to be positioned in an aperture region, a distance between the lens surface and the wiring layer is increased. Thus, when manufacturing the element substrate, the accuracy of positioning between the lens surface and the aperture region deteriorates. As a result, there is a problem in that light transmittance in the aperture region and the pixel electrodes is reduced.

SUMMARY

An electro-optical device according to an aspect of the present disclosure includes a transmissive substrate including a lens surface having a concave curved surface shape, a transmissive lens layer disposed at the substrate and in contact with the lens surface, an optical path adjustment layer disposed on an opposite side of the lens layer from the lens surface and configured to adjust an optical path length of light passing through the lens surface, a wiring layer including a transmissive light transmitting portion and a wiring portion that includes wiring disposed around the light transmitting portion in plan view from a thickness direction of the substrate, the wiring layer being disposed in contact with the optical path adjustment layer on an opposite side of the optical path adjustment layer from the lens layer, a transmissive pixel electrode disposed on an opposite side of the wiring layer from the optical path adjustment layer, the pixel electrode overlapping the light transmitting portion in plan view and being electrically coupled to the wiring, a first mark disposed between the substrate and the optical path adjustment layer and being in contact with the substrate, and a second mark disposed between the optical path adjustment layer and the wiring layer and being in contact with the optical path adjustment layer.

A method for manufacturing an electro-optical device according to an aspect of the present disclosure includes forming a first mark in contact with a transmissive substrate, forming a lens surface having a concave curved surface shape at a surface side of the substrate at which the first mark is formed, forming a transmissive lens layer on the lens surface, forming an optical path adjustment layer on an opposite side of the lens layer from the lens surface, the optical path adjustment layer being configured to adjust an optical path length of light passing through the lens surface, forming a wiring layer including a light transmitting portion through which light passes, and a wiring portion that includes wiring disposed around the light transmitting portion in plan view from a thickness direction of the substrate, the wiring layer being formed on an opposite side of the optical path adjustment layer from the lens layer and being in contact with the optical path adjustment layer, forming a second mark in contact with the optical path adjustment layer on an opposite side of the optical path adjustment layer from the substrate, and forming a transmissive pixel electrode on an opposite side of the wiring layer from the optical path adjustment layer, the pixel electrode overlapping the light transmitting portion in plan view and being electrically coupled to the wiring.

A member for manufacturing an electro-optical device according to an aspect of the present disclosure includes a transmissive substrate including a first surface, a second surface, and a side surface connecting the first surface and the second surface, and a lens surface at the first surface, a transmissive lens layer disposed at the first surface and in contact with the lens surface, an optical path adjustment layer disposed on an opposite side of the lens layer from the lens surface and configured to adjust an optical path length of light passing through the lens surface, a wiring layer including a transmissive light transmitting portion and a wiring portion that includes wiring disposed around the light transmitting portion in plan view from a thickness direction of the substrate, the wiring layer being disposed in contact with the optical path adjustment layer on an opposite side of the optical path adjustment layer from the lens layer, a transmissive pixel electrode disposed on an opposite side of the wiring layer from the optical path adjustment layer, the pixel electrode overlapping the light transmitting portion in plan view and being electrically coupled to the wiring, a first mark disposed between the substrate and the optical path adjustment layer and being in contact with the substrate, and a second mark disposed between the optical path adjustment layer and the wiring layer and being in contact with the optical path adjustment layer.

DESCRIPTION OF EXEMPLARY EMBODIMENTS

Figure 1:
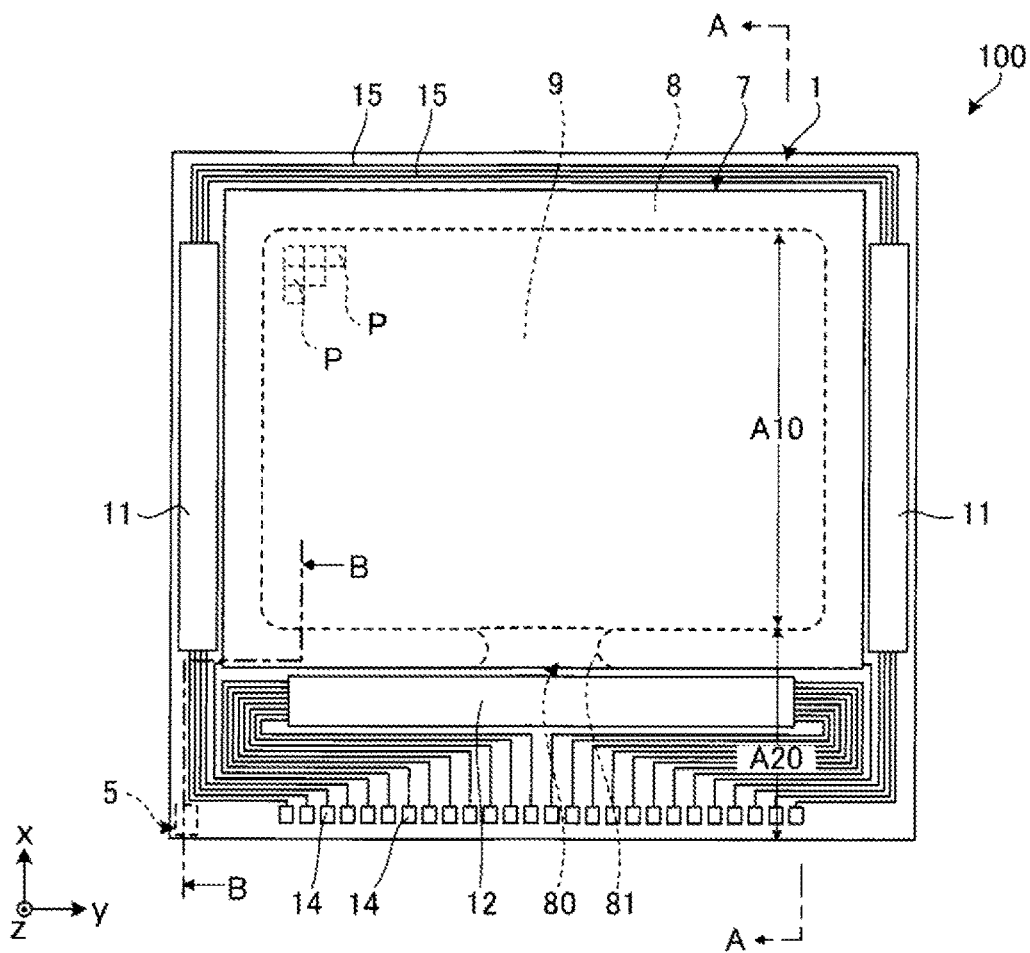
FIG. 1 is a schematic plan diagram of an electro-optical device according to a first embodiment.

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise stated to limit the disclosure in the following descriptions. Note that, in the present specification, "parallel" does not only include a case in which two surfaces or lines are completely parallel to each other, but also a case in which one is inclined with respect to the other within a range of ±3°.

1. Electro-Optical Device

1-1. First Embodiment

As an example of an electro-optical device of the present disclosure, an active matrix liquid crystal display device will be described as an example.

1-1a. Basic Configuration

Figure 2:
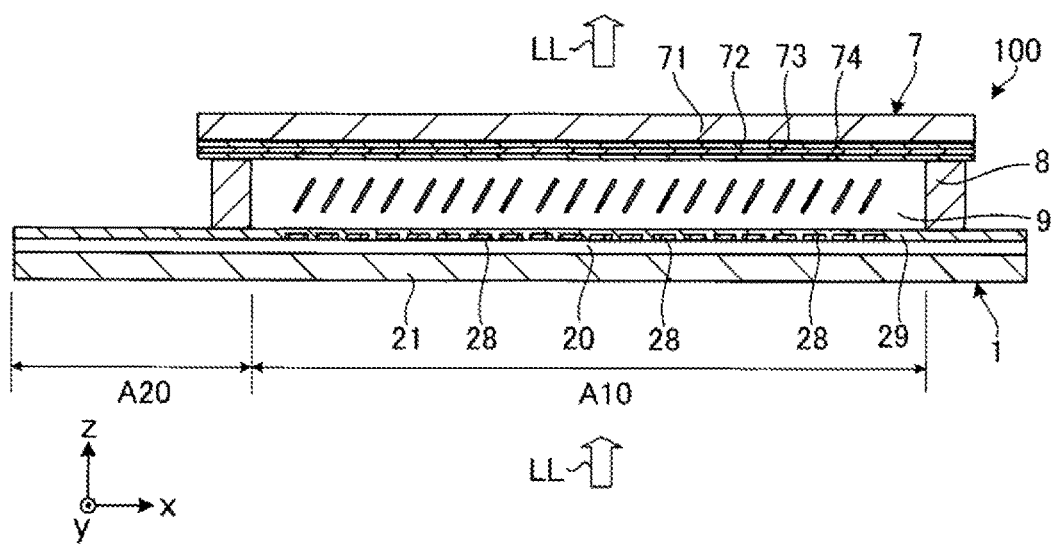
FIG. 2 is a schematic cross-sectional diagram of the electro-optical device according to the first embodiment.

FIG. 1 is a schematic plan diagram of an electro-optical device 100 according to a first embodiment. FIG. 2 is a schematic cross-sectional diagram of the electro-optical device 100 according to the first embodiment, and is a cross-sectional diagram taken along a line A-A in FIG. 1. Note that, for convenience of explanation, the description will be made below using, as appropriate, an x-axis, a y-axis, and a z-axis orthogonal to each other illustrated in FIG. 1 and FIG. 2.

The electro-optical device 100 illustrated in FIG. 1 and FIG. 2 is a transmission type liquid crystal display device. As illustrated in FIG. 2, the electro-optical device 100 includes a transmissive element substrate 1, a transmissive counter substrate 7, a frame-shaped sealing member 8, and a liquid crystal layer 9. The sealing member 8 is disposed between the element substrate 1 and the counter substrate 7. The liquid crystal layer 9 is disposed in a region surrounded by the element substrate 1, the counter substrate 7, and the sealing member 8. Here, the alignment direction of the element substrate 1, the liquid crystal layer 9, and the counter substrate 7 is in the z-direction, and the surface of the element substrate 1 is parallel to the x-y plane. In addition, viewing in the z-direction parallel to the thickness direction of a substrate 21 of the element substrate 1 to be described later is referred to as a "plan view".

In the present embodiment, light LL is incident on the electro-optical device 100 from the element substrate 1, passes through the liquid crystal layer 9, and is emitted from the counter substrate 7. Note that, in the present specification, incident light incident on the electro-optical device 100, light passing through the electro-optical device 100, and emitted light emitted from the electro-optical device 100 are all illustrated as the light LL without any distinction. Further, the light LL is visible light, and in the present specification, "transmissive" refers to transmittance with respect to visible light, and refers to transmittance of visible light that may be 50% or higher.

As illustrated in FIG. 1, the electro-optical device 100 forms a square shape in plan view, but the shape of the electro-optical device 100 in plan view is not limited to the square shape, and may be a circular shape or the like.

As illustrated in FIG. 1, the element substrate 1 has a size encompassing the counter substrate 7 in plan view. As illustrated in FIG. 2, the element substrate 1 includes the substrate 21, a plurality of pixel electrodes 28, and an oriented film 29. The substrate 21 is configured by a flat plate that is transmissive and has insulating properties. The plurality of pixel electrodes 28 is transmissive and are configured by a transparent conductive material, such as indium tin oxide (ITO) or indium zinc oxide (IZO), for example. The oriented film 29 is positioned furthermost to the liquid crystal layer 9 side of the element substrate 1, and orients the liquid crystal molecules of the liquid crystal layer 9. Examples of the constituent material of the oriented film 29 include polyimide and silicon oxide, for example. A wiring layer 20 and the like are disposed between the substrate 21 and the pixel electrodes 28. The wiring layer 20 and the like will be described later.

As illustrated in FIG. 2, the counter substrate 7 includes a substrate 71, an insulating layer 72, a common electrode 73, and an oriented film 74. The substrate 71, the insulating layer 72, the common electrode 73, and the oriented film 74 are arranged in this order. The oriented film 74 is positioned furthermost to the liquid crystal layer 9 side. The substrate 71 is configured by a flat plate that is transmissive and has insulating properties. The substrate 71 is configured by glass, quartz, or the like, for example. The common electrode 73 is laminated to the substrate 71 via the insulating layer 72 formed using a transmissive insulating material. The common electrode 73 is configured by a transparent conductive material such as ITO or IZO, for example. The oriented film 74 orients the liquid crystal molecules of the liquid crystal layer 9. Examples of the constituent material of the oriented film 74 include polyimide and silicon oxide, for example.

The sealing member 8 is formed using an adhesive or the like containing various types of curable resin, such as epoxy resin, for example. The sealing member 8 is affixed to each of the element substrate 1 and the counter substrate 7. An injection port 81 for injecting a liquid crystal material containing liquid crystal molecules is formed in a part of the sealing member 8, and the injection port 81 is sealed by a sealing material 80 formed using various types of resin material.

The liquid crystal layer 9 contains liquid crystal molecules having positive or negative dielectric anisotropy. The liquid crystal layer 9 is interposed between the element substrate 1 and the counter substrate 7 such that the liquid crystal molecules are in contact with both the oriented film 29 and the oriented film 74. The orientation of the liquid crystal molecules included in the liquid crystal layer 9 changes depending on a voltage applied to the liquid crystal layer 9. The liquid crystal layer 9 makes gradation display possible by modulating light in accordance with the applied voltage.

Further, as illustrated in FIG. 1, a plurality of scanning line drive circuits 11, a signal line drive circuit 12, and a plurality of external terminals 14 is arranged on the surface of the element substrate 1 on the counter substrate 7 side. The external terminals 14 are coupled to wiring lines 15 routed from each of the scanning line drive circuits 11 and the signal line drive circuit 12.

The electro-optical device 100 having this configuration includes a display region A10 that displays images and the like, and a peripheral region A20 that surrounds the display region A10 in plan view. A plurality of pixels P arranged in a matrix pattern is provided in the display region A10. One of the pixel electrodes 28 is arranged in one of the pixels P. The scanning line drive circuits 11, the signal line drive circuit 12, and the like are arranged in the peripheral region A20.

1-1b. Electrical Configuration

Figure 3:
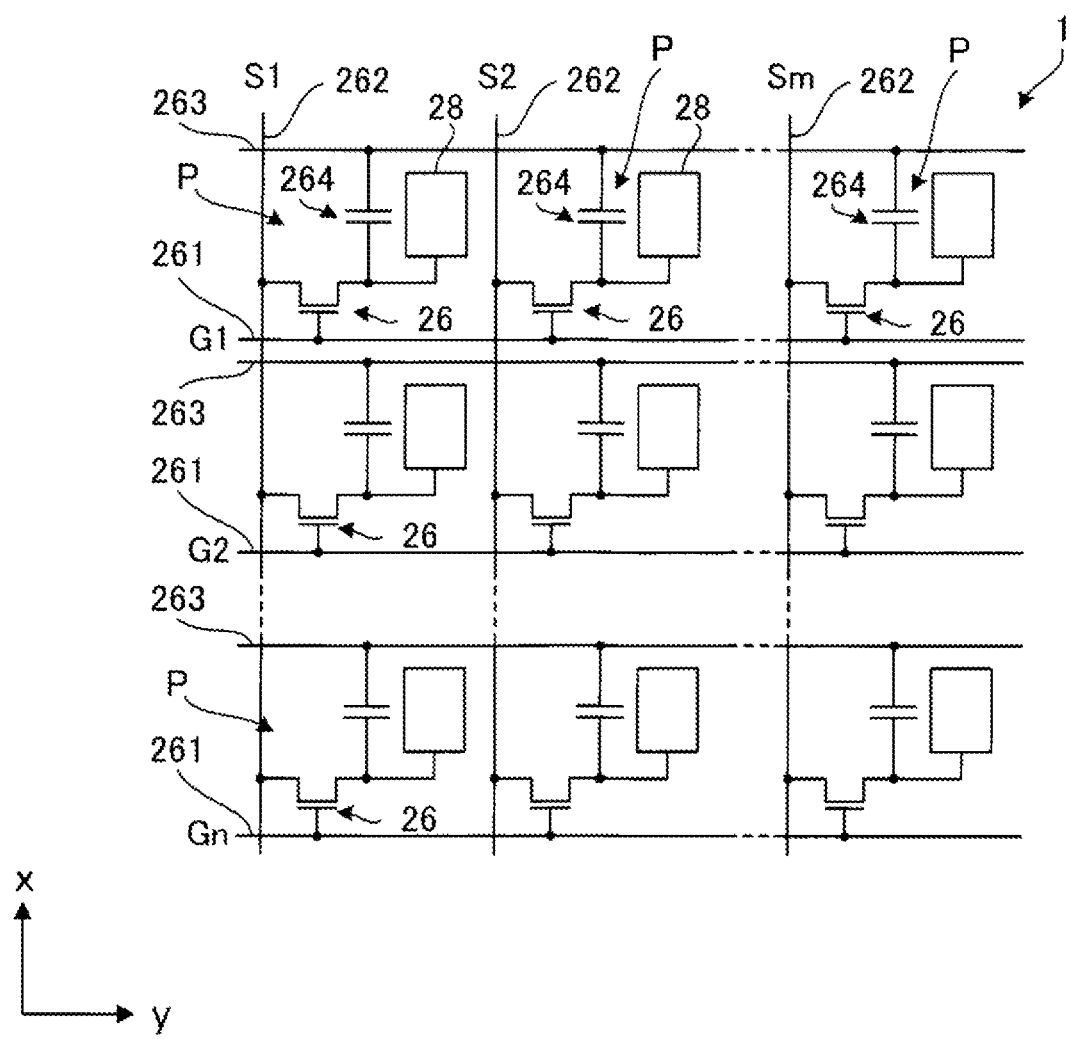
FIG. 3 is an equivalent circuit diagram illustrating an electrical configuration of an element substrate according to the first embodiment.

FIG. 3 is an equivalent circuit diagram illustrating an electrical configuration of the element substrate 1 according to the first embodiment. As illustrated in FIG. 3, a number n of scanning lines 261, a number m of signal lines 262, and a number n of capacitance lines 263 are provided on the element substrate 1. Note that both n and m are integers of 2 or more. A TFT 26 serving as a switching element is arranged corresponding to each of intersections between the n scanning lines 261 and the m signal lines 262.

The n scanning lines 261 each extend in the y direction and are arranged at equal intervals in the x direction. The scanning line 261 is electrically coupled to a gate of the TFT 26. The n scanning lines 261 are electrically coupled to the scanning line drive circuits 11 illustrated in FIG. 1. Scanning signals G1, G2, • • •, Gn are line-sequentially supplied from the scanning line drive circuits 11 to the n scanning lines 261.

The m signal lines 262 illustrated in FIG. 3 each extend in the x direction and are arranged at equal intervals in the y direction. The signal line 262 is electrically coupled to a source of the TFT 26. The m signal lines 262 are electrically coupled to the signal line drive circuit 12 illustrated in FIG. 1. Image signals S1, S2, • • •, Sm are supplied in parallel from the signal line drive circuit 12 illustrated in FIG. 1 to the m signal lines 262.

The n scanning lines 261 and the m signal lines 262 illustrated in FIG. 3 are insulated from each other and form a lattice pattern in plan view. A region surrounded by two adjacent scanning lines 261 and two adjacent signal lines 262 corresponds to the pixel P. Each of the pixel electrodes 28 is formed in each of the pixels P. The pixel electrode 28 is electrically coupled to the TFT 26.

The n capacitance lines 263 each extend in the y direction and are arranged at equal intervals in the x direction. The n capacitance lines 263 are insulated from the plurality of signal lines 262 and the plurality of scanning lines 261, and are formed so as to be separated from these lines. A fixed potential such as a ground potential is applied to the capacitance lines 263. Further, a storage capacitance 264 is provided in parallel to a liquid crystal capacitance, between each of the capacitance lines 263 and each of the pixel electrodes 28, to prevent leakage of a charge held in the liquid crystal capacitance.

When the scanning signals G1, G2, • • •, Gn become sequentially active and the n scanning lines 261 are sequentially selected, the TFT 26 coupled to the selected scanning line 261 is turned to an on-state. Then, via the m signal lines 262, the image signals S1, S2, . . . , Sm having magnitudes corresponding to the gradation to be displayed are captured by the pixel P corresponding to the selected scanning line 261, and are applied to the pixel electrode 28. In this way, a voltage corresponding to the gradation to be displayed is applied to the liquid crystal capacitance formed between the pixel electrode 28 and the common electrode 73 included in the counter substrate 7 illustrated in FIG. 2, and the orientation of the liquid crystal molecules changes in accordance with the applied voltage. Further, the applied voltage is held by the storage capacitance 264. In this way, the light is modulated by the changes in the orientation of the liquid crystal molecules, and the gradation display is made possible.

1-1c. Configuration of Element Substrate 1

Figure 4:
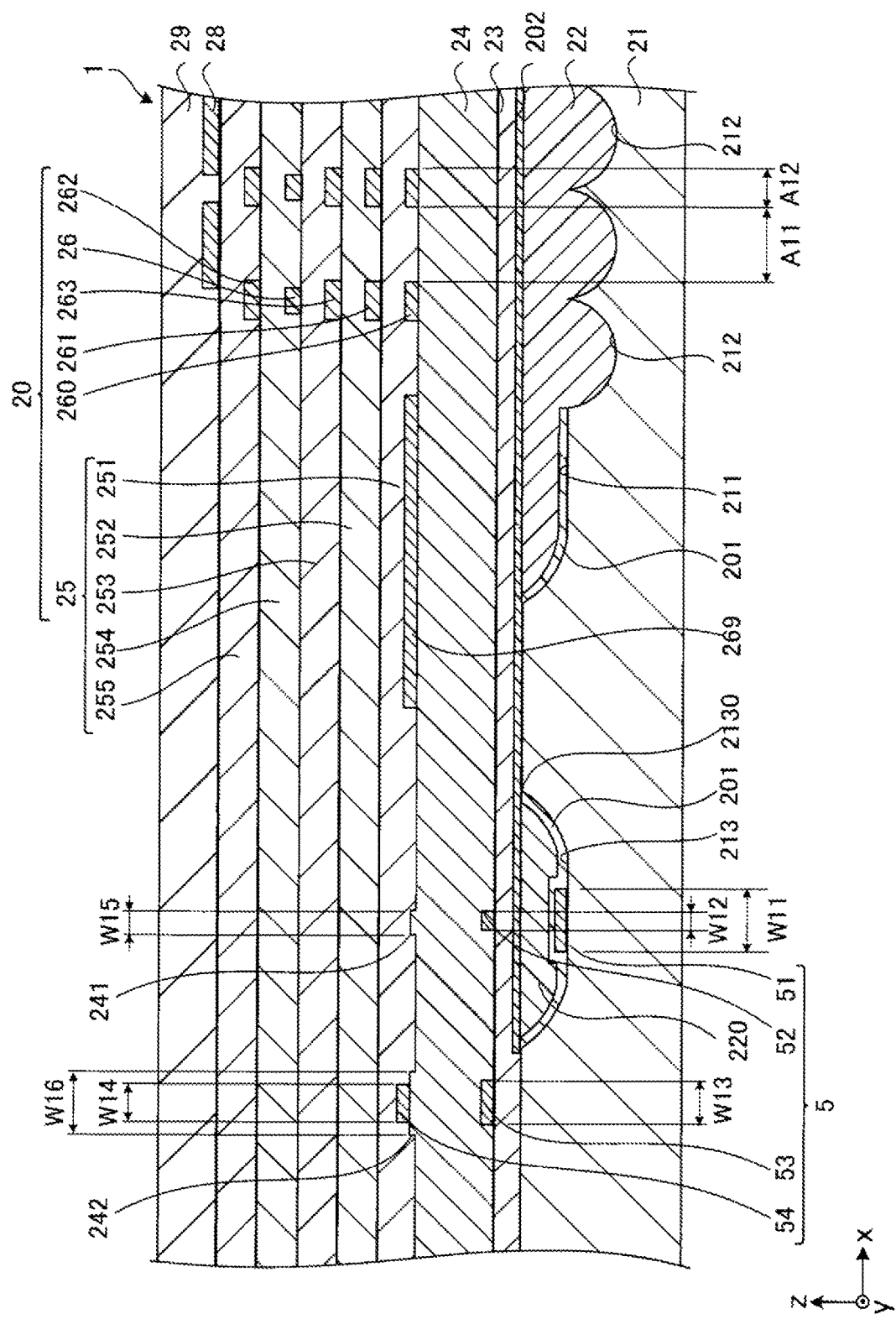
FIG. 4 is a schematic cross-sectional diagram illustrating a configuration of the element substrate according to the first embodiment.

FIG. 4 is a schematic cross-sectional diagram illustrating a configuration of the element substrate 1 according to the first embodiment, and is a cross-sectional diagram taken along a line B-B illustrated in FIG. 1. The element substrate 1 includes the substrate 21, a lens layer 22, a protective layer 23, an optical path adjustment layer 24, the wiring layer 20, the pixel electrodes 28, and the oriented film 29. The lens layer 22, the protective layer 23, the optical path adjustment layer 24, the wiring layer 20, and the pixel electrodes 28 are arranged in this order from the substrate 21 toward the oriented film 29. These layers are formed by known film forming techniques or the like. Further, the substrate 21 includes a lens surface 212. The wiring layer 20 includes a light transmitting portion A11 through which light passes and a wiring portion A12 by which light is blocked. Furthermore, the element substrate 1 includes a position adjustment portion 5 that will be described in detail below. The position adjustment portion 5 is used to adjust a relative positional relationship between the lens surface 212 and the light transmitting portion A11 in a plan view when manufacturing the element substrate 1. In the present embodiment, the position adjustment portion 5 is provided in the peripheral region A20 as illustrated in FIG. 1, but the position adjustment portion 5 may be provided in the display region A10.

Substrate 21

As illustrated in FIG. 4, the substrate 21 is transmissive and has insulating properties. The substrate 21 is configured by glass or quartz, for example. The substrate 21 includes a first concave portion 211 and a second concave portion 213 positioned outside of the first concave portion 211 in plan view. The first concave portion 211 and the second concave portion 213 are indentations formed in the surface of the substrate 21 on the +z side.

A plurality of the lens surfaces 212 each having a concave curved surface shape is provided on the bottom surface of the first concave portion 211. The plurality of lens surfaces 212 is arranged in a matrix pattern in the x direction and the y direction. The lens surface 212 is formed for each of the pixel electrodes 28. A first convex portion 51 included in the position adjustment portion 5 to be described later is disposed at the second concave portion 213. Further, a first protective film 201 configured by a silicon oxide film, for example, is disposed on a portion of the first concave portion 211 and the second concave portion 213. The first protective film 201 disposed on the second concave portion 213 covers the first convex portion 51. The first protective film 201 protects the first convex portion 51 so that the first convex portion 51 is not removed by etching when manufacturing the element substrate 1. Note that the first protective film 201 may be omitted.

Lens Layer 22

The lens layer 22 is disposed on the substrate 21 so as to fill in the first concave portion 211. The lens layer 22 is in contact with the lens surface 212. The lens layer 22 is transmissive and has insulating properties. The refractive index of the lens layer 22 is different from the refractive index of the substrate 21, and a lens is configured by the lens surface 212 and the lens layer 22. In the present embodiment, the refractive index of the lens layer 22 is greater than the refractive index of the substrate 21. The lens converges the light LL incident on the element substrate 1. The constituent material of the lens layer 22 is, for example, silicon oxynitride.

Here, as described above, the substrate 21 includes the first concave portion 211 and the plurality of lens surfaces 212 each having the concave curved surface shape provided on the bottom surface of the first concave portion 211. By forming the lens surface 212 on the bottom surface of the first concave portion 211, the adhesion between the lens surface 212 and the lens layer 22 can be increased compared to a case in which the first concave portion 211 is not provided. Therefore, the occurrence of cracks in the lens layer 22 can be reduced, and peeling of the lens layer 22 from the substrate 21 can be suppressed. In addition, as a result of the substrate 21 including the first concave portion 211, the optical path length of the light can be increased compared to a case in which the first concave portion 211 is not provided.

Furthermore, a filling layer 220 is disposed at the second concave portion 213 described above. The filling layer 220 is disposed in contact with the first protective film 201 so as to fill in the second concave portion 213. The filling layer 220 is transmissive and has insulating properties. The constituent material of the filling layer 220 is, for example, silicon oxynitride that is the same as the constituent material of the above-described lens layer 22. Note that the constituent material of the filling layer 220 may be different from the constituent material of the lens layer 22.

A second protective film 202 configured by a silicon nitride film, for example, is disposed on the lens layer 22 and the filling layer 220. The second protective film 202 is provided in order to reduce the occurrence of warping in the substrate 21 and the like as a result of annealing processing when manufacturing the element substrate 1. Note that the second protective film 202 may be omitted.

Protective Layer 23

The protective layer 23 is transmissive and has insulating properties. The protective layer 23 is disposed on the substrate 21 so as to cover the second protective film 202. In other words, the protective layer 23 is disposed between the lens layer 22 and the optical path adjustment layer 24 to be described below. With the protective layer 23 disposed therebetween, the lens layer 22 can be protected such that the lens layer 22 is not etched when manufacturing the element substrate 1. In addition, as a result of the protective layer 23 being provided, the occurrence of cracks and the like in the lens layer 22 can be suppressed when manufacturing the element substrate 1 compared to a case in which the protective layer 23 is not provided. Examples of the constituent material of the protective layer 23 include inorganic compounds containing silicon, and of these, may include silicon oxide.

Optical Path Adjustment Layer 24

The optical path adjustment layer 24 is disposed on the protective layer 23 so as to be in contact with the surface of the protective layer 23 on the +z axis side. In other words, the optical path adjustment layer 24 is disposed on the opposite side of the lens surface 212 from the lens layer 22. The optical path adjustment layer 24 is transmissive and has insulating properties. The optical path adjustment layer 24 adjusts the optical path length of the light passing through the lens surface 212. By adjusting the thickness of the optical path adjustment layer 24, the condensing position of the light LL by the lens can be adjusted to a desired position. For example, by converging the condensing position of the light LL into the light transmitting portion A11, the light incident on the light transmitting portion A11 can be increased while reducing the light incident on the wiring portion A12 of the wiring layer 20. Further, examples of the constituent material of the optical path adjustment layer 24 include inorganic compounds containing silicon, and of these, may include silicon oxide.

The thickness of the optical path adjustment layer 24 may be from 2 to 30 μm, is more preferably from 3 to 15 μm, and is even more preferably from 5 to 10 μm. When the thickness of the optical path adjustment layer 24 is within the range described above, the necessary optical path length is easily secured, and it is easy to position the condensing position of the light LL in the light transmitting portion A11, for example. Therefore, the light LL incident on the light transmitting portion A11 is particularly easily increased, while reducing the light LL incident on the wiring portion A12 of the wiring layer 20. Note that when the optical path adjustment layer 24 is adopted as a micro lens used in a general active matrix type liquid crystal display device, the light LL incident on the light transmitting portion A11 can be increased, as described above, by setting the optical path adjustment layer 24 to have a thickness within the range described above.

Here, as described above, as a result of the first concave portion 211 being provided in the substrate 21, the condensing position of the light LL can be positioned in the light transmitting portion A11, for example, even when the thickness of the optical path adjustment layer 24 is not made extremely thick, compared to a case in which the first concave portion 211 is not provided. By not making the thickness of the optical path adjustment layer 24 extremely thick, it is possible to suppress the thickness of the entire element substrate 1 from being extremely thick. Thus, the element substrate 1 can be caused to have a low profile.

Note that the thickness of the optical path adjustment layer 24 is not limited to being set such that the condensing position of the light LL is positioned in the light transmitting portion A11, and may be set so as to adjust the condensing position to a desired position other than in the light transmitting portion A11.

Wiring Layer 20

The wiring layer 20 includes a light shielding film 260, the scanning lines 261, the capacitance lines 263, the TFTs 26, the signal lines 262, and an insulator 25. The scanning lines 261, the capacitance lines 263, and the signal lines 262 each correspond to "wiring lines". The light shielding film 260, the scanning lines 261, the capacitance lines 263, the TFTs 26, and the signal lines 262 are arranged in this order from the optical path adjustment layer 24 toward the oriented film 29. Note that the order of the light shielding film 260, the scanning lines 261, the capacitance lines 263, the TFTs 26, and the signal lines 262 illustrated in FIG. 4 is an example, and the order of these is not limited to the example illustrated. Further, as described above, the signal lines 262 extend in the x direction, but in FIG. 4, the arrangement of the signal lines 262 differs from the actual arrangement, in order to facilitate understanding.

The insulator 25 includes a first interlayer insulating film 251, a second interlayer insulating film 252, a third interlayer insulating film 253, a fourth interlayer insulating film 254, and a fifth interlayer insulating film 255. The first interlayer insulating film 251 is disposed on the optical path adjustment layer 24, and is positioned between the light shielding film 260 and the scanning lines 261. The second interlayer insulating film 252 is disposed on the first interlayer insulating film 251, and is positioned between the scanning lines 261 and the capacitance lines 263. The third interlayer insulating film 253 is disposed on the second interlayer insulating film 252, and is positioned between the capacitance lines 263 and the TFTs 26. The fourth interlayer insulating film 254 is disposed on the third interlayer insulating film 253, and is disposed between the TFTs 26 and the signal lines 262. The fifth interlayer insulating film 255 is disposed on the fourth interlayer insulating film 254 and covers the signal lines 262.

In addition, a light shielding film 269 overlapping the first concave portion 211 in a plan view is disposed on the optical path adjustment layer 24. Note that the light shielding film 269 does not overlap with the lens surface 212 in plan view. The light shielding film 269 blocks the light LL that does not pass through the lens surface 212. Stray light in the wiring layer 20 can be reduced or prevented by this blocking. In addition, the light shielding film 269 overlaps in plan view with the TFT 26, and suppresses or prevents the incidence of the light LL on the TFT 26. Note that the light shielding film 260 and the light shielding film 269 may be omitted.

Examples of the material of each layer configuring the insulator 25 include inorganic compounds including silicon, and of these, may include silicon oxide. Note that each of the layers configuring the insulator 25 may be the same material or may be different materials. Further, examples of the constituent material of each of the light shielding film 260, the light shielding film 269, the scanning lines 261, the capacitance lines 263, the TFTs 26, and the signal lines 262 include a metal material, such as metal, a metal silicide, a metal compound, and the like. The constituent materials of each of the light shielding film 260, the light shielding film 269, the scanning lines 261, the capacitance lines 263, the TFTs 26, and the signal lines 262 may be the same material or may be different materials.

Here, in the display region A10, the wiring layer 20 includes a plurality of the transmissive light transmitting portions A11, and the wiring portion A12 that blocks the light. Each of the light transmitting portions A11 is a region of the wiring layer 20 through which light passes in a plan view. Further, in a plan view, the wiring portion A12 is a region positioned around the light transmitting portions A11 including the light shielding film 260, the TFTs 26, the scanning lines 261, the signal lines 262, and the capacitance lines 263. As described above, the scanning lines 261 and the signal lines 262 intersect each other and form a lattice pattern in plan view. Thus, although not illustrated in detail, the wiring portion A12 forms a lattice pattern in plan view. On the other hand, the plurality of light transmitting portions A11 is arranged in a matrix pattern in plan view. The light transmitting portion A11 is disposed for each of the lens surfaces 212.

Pixel Electrode 28

The plurality of pixel electrodes 28 is disposed on the wiring layer 20 so as to be in contact with the surface of the wiring layer 20 on the +z axis side. In other words, the plurality of pixel electrodes 28 is positioned opposite to the optical path adjustment layer 24 from the wiring layer 20 and is disposed in contact with the wiring layer 20. The plurality of pixel electrodes 28 is arranged in a lattice pattern overlapping the light transmitting portions A11 in plan view. Each of the pixel electrodes 28 is disposed so as to be paired with each of the light transmitting portions A11. The pixel electrode 28 is electrically coupled to a drain of the TFT 26, which is an example of the "wiring line". Note that, as described above, the oriented film 29 is disposed on the plurality of pixel electrodes 28.

1-1d. Configuration of Position Adjustment Portion 5

As illustrated in FIG. 4, the element substrate 1 includes the position adjustment portion 5. As described above, the position adjustment portion 5 is used to adjust the relative positional relationship between the lens surface 212 and the light transmitting portion A11 in plan view. By using the position adjustment portion 5, the positional relationship between the plurality of lens surfaces 212 and the plurality of light transmitting portions A11 can be adjusted so that one of the light transmitting portions A11 overlaps one of the lens surfaces 212 in a plan view. The position adjustment portion 5 includes the first convex portion 51, a second convex portion 52, a third convex portion 53, and a fourth convex portion 54. These are alignment marks for adjusting the relative positional relationship of two or more sections that are respective targets. Further, the first convex portion 51 is an example of a "first mark", the second convex portion 52 is an example of a "third mark", and the fourth convex portion 54 is an example of a "second mark". Additionally, in the present embodiment, planar shapes of each of the first convex portion 51, the second convex portion 52, the third convex portion 53, and the fourth convex portion 54 are square-shaped. Note that each of these planar shapes is not limited to the square shape, and may be, for example, a circular shape or a polygonal shape other than the square shape.

First Convex Portion 51

The first convex portion 51 is disposed between the substrate 21 and the protective layer 23 so as to be in contact with the substrate 21, and protrudes from the substrate 21 toward the protective layer 23. In the present embodiment, the first convex portion 51 is disposed at the second concave portion 213 of the substrate 21. The light transmittance of the first convex portion 51 is lower than the light transmittance of the substrate 21. The first convex portion 51 includes silicon or silicon oxynitride, for example. Note that the first convex portion 51 may be configured by a variety of metal materials, for example.

Second Convex Portion 52

The second convex portion 52 is disposed between the protective layer 23 and the optical path adjustment layer 24 so as to be in contact with the protective layer 23, and protrudes from the protective layer 23 toward the optical path adjustment layer 24. The light transmittance of the second convex portion 52 is lower than the light transmittance of the protective layer 23. The first convex portion 52 includes silicon or silicon oxynitride, for example.

Figure 5:
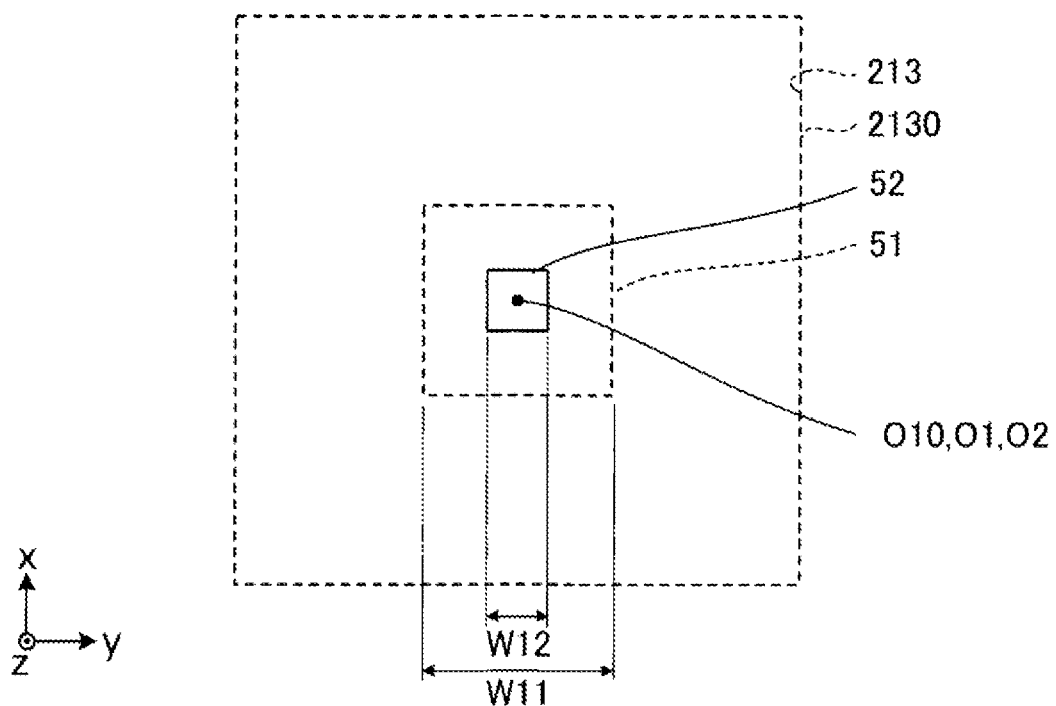
FIG. 5 is a diagram illustrating an arrangement of a second concave portion, a first convex portion, and a second convex portion according to the first embodiment.

FIG. 5 is a diagram illustrating an arrangement of the second concave portion 213, the first convex portion 51, and the second convex portion 52 according to the first embodiment. As illustrated in FIG. 5, the second convex portion 52 overlaps the first convex portion 51 in plan view. The planar area of the second convex portion 52 is smaller than the planar area of the first convex portion 51. In the drawings, a width W12 of the second convex portion 52 along the y direction is smaller than a width W11 of the first convex portion 51 along the y direction. In addition, a geometric center O2 of the second convex portion 52 in plan view is aligned with a geometric center O1 of the first convex portion 51 in plan view. Further, in the present embodiment, an opening edge 2130 of the second concave portion 213 is rectangular in plan view, and the geometric center O1 is aligned with a geometric center O10, in plan view, of a region surrounded by the opening edge 2130. Here, "aligned" includes not only a perfect alignment, but also a case in which a distance between the centers is within a range of 1 µm or less. Additionally, in the present embodiment, each of the planar shapes of the region surrounded by the opening edge 2130, the first convex portion 51, and the second convex portion 52 are substantially similar and have sides that are substantially parallel to each other.

Third Convex Portion 53

As illustrated in FIG. 4, the third convex portion 53 is disposed between the protective layer 23 and the optical path adjustment layer 24 so as to be in contact with the protective layer 23, and protrudes from the protective layer 23 toward the optical path adjustment layer 24. The third convex portion 53 is disposed on the same plane as the second convex portion 52 and is positioned in the vicinity of the second convex portion 52 while being separated from the second convex portion 52. The planar area of the third convex portion 53 is greater than the planar area of the second convex portion 52. In the drawings, the width W12 of the second convex portion 52 is smaller than a width W13 of the third convex portion 53 along the y direction. Further, in the present embodiment, the light transmittance of the third convex portion 53 is equal to that of the second convex portion 52, and the constituent material of the third convex portion 53 is the same as that of the second convex portion 52. Note that the light transmittance and the constituent material of the third convex portion 53 may be different from those of the second convex portion 52. Furthermore, the light transmittance of the above-described second convex portion 52 and third convex portion 53 may be equal to or higher than the light transmittance of the protective layer 23.

Here, the surface of the optical path adjustment layer 24 on the +z axis side has a first section 241 that overlaps the second convex portion 52 in plan view, and a second section 242 that overlaps the third convex portion 53 in plan view. Of the surface on the +z axis side of the optical path adjustment layer 24, the first section 241 and the second section 242 protrude further toward the wiring layer 20 than sections other than the first section 241 and the second section 242. The first section 241 has a shape corresponding to the shape of the second convex portion 52, and the second section 242 has a shape corresponding to the third convex portion 53. That is, the first section 241 that reflects the film thickness of the second convex portion 52 is formed to have the same planar shape as the second convex portion 52, and the second section 242 that reflects the film thickness of the third convex portion 53 is formed to have the same planar shape as the third convex portion 53. Thus, the planar area of the second section 242 is larger than the planar area of the first section 241. In the drawings, a width W16 of the second section 242 along the y direction is larger than a width W15 of the first section 241 along the y direction.

Fourth Convex Portion 54

The fourth convex portion 54 is disposed between the optical path adjustment layer 24 and the wiring layer 20 so as to be in contact with the optical path adjustment layer 24, and protrudes from the optical path adjustment layer 24 toward the wiring layer 20. The fourth convex portion 54 is disposed on the second section 242 of the optical path adjustment layer 24. The light transmittance of the fourth convex portion 54 is lower than the light transmittance of the optical path adjustment layer 24. The fourth convex portion 54 includes, for example, a metal material. Further, in the present embodiment, the constituent material of the fourth convex portion 54 is the same as the constituent material of the light shielding film 260, but may be different.

Figure 6:
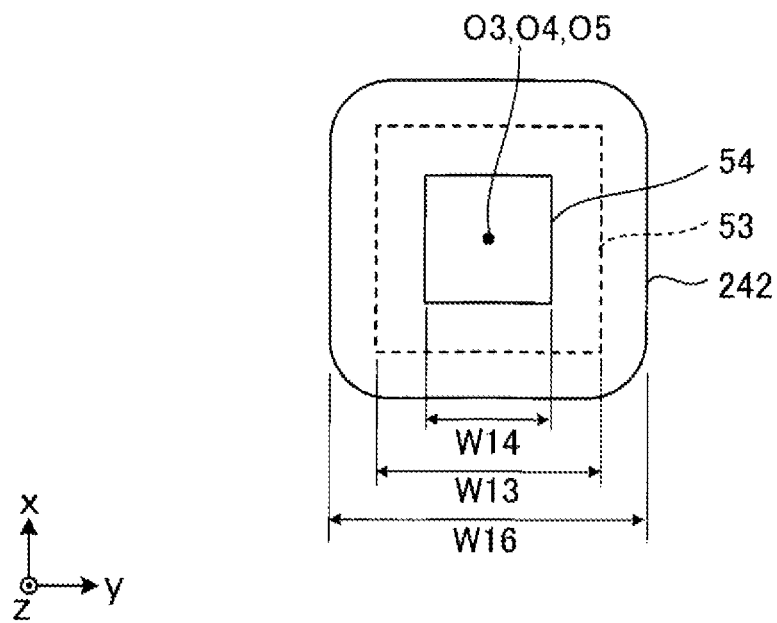
FIG. 6 is a diagram illustrating an arrangement of a third convex portion, a second section, and a fourth convex portion according to the first embodiment.

FIG. 6 is a diagram illustrating an arrangement of the third convex portion 53, the second section 242, and the fourth convex portion 54 according to the first embodiment. As illustrated in FIG. 6, the fourth convex portion 54 overlaps the second section 242 in plan view. The planar area of the fourth convex portion 54 is smaller than the planar area of the second section 242. In the drawings, a width W14 of the fourth convex portion 54 along the y direction is smaller than the width W16 of the second section 242. A geometric center O4 of the fourth convex portion 54 in plan view is aligned with a geometric center O5 in plan view of the second section 242. Note that because the fourth convex portion 54 overlaps the second section 242 in plan view, the fourth convex portion 54 also overlaps the third convex portion 53 in plan view. The geometric center O4 of the fourth convex portion 54 in plan view is aligned with a geometric center O3 of the third convex portion 53 in plan view. Here, "aligned" includes not only a perfect alignment, but also a case in which a distance between the centers is within a range of 1 µm or less. Further, in the present embodiment, the planar shapes of the third convex portion 53, the second section 242, and the second convex portion 52 are substantially similar and have sides that are substantially parallel to each other.

As described above, the element substrate 1 includes the substrate 21 including the lens surface 212, the lens layer 22, the optical path adjustment layer 24, the wiring layer 20, and the pixel electrodes 28. The wiring layer 20 is disposed so as to be in contact with the optical path adjustment layer 24, and includes the light transmitting portion A11 and the wiring portion A12. Then, the first convex portion 51 is disposed between the substrate 21 and the optical path adjustment layer 24 so as to be in contact with the substrate 21, and the fourth convex portion 54 is disposed between the optical path adjustment layer 24 and the wiring layer 20 so as to be in contact with the optical path adjustment layer 24.

The first convex portion 51 is disposed so as to be in contact with the substrate 21. Thus, when manufacturing the element substrate 1, by forming the lens surface 212 with the first convex portion 51 as a reference, errors in position in plan view of the first convex portion 51 and the lens surface 212 are sufficiently reduced. In addition, the light shielding film 260 of the wiring layer 20 is disposed so as to be in contact with the optical path adjustment layer 24, and the fourth convex portion 54 is similarly disposed so as to be in contact with the optical path adjustment layer 24. Therefore, when manufacturing the element substrate 1, by forming the light shielding film 260 with the fourth convex portion 54 as a reference, errors in position in plan view of the fourth convex portion 54 and the light transmitting portion A11 are sufficiently reduced. Therefore, the relative positioning in plan view of the lens surface 212 and the light transmitting portion A11 can be performed with high accuracy. Thus, a relative positional displacement of the lens surface 212 and the light transmitting portion A11 in plan view can be reduced. Accordingly, a relative positional displacement of the lens surface 212 and the pixel electrode 28 in a plan view can also be reduced. Thus, the light incident on the pixel electrode 28 can be increased, and the efficiency of utilization of light in the element substrate 1 can be improved.

Furthermore, as described above, the light transmittance of the first convex portion 51 is lower than the light transmittance of the substrate 21, and the light transmittance of the fourth convex portion 54 is lower than the light transmittance of the optical path adjustment layer 24. By using the first convex portion 51 and the fourth convex portion 54 having the light transmittance described above, a contour can be easily grasped, and thus a relative position in plan view of the fourth convex portion 54 with respect to the first convex portion 51 can be determined using, for example, an optical microscope or the like. Note that the above-described positional adjustment may be performed using the difference in light transmittance relating to a wavelength range other than visible light.

Specifically, the first convex portion 51 includes silicon or silicon oxynitride. By including this material, the first convex portion 51 having the intended shape and size can be formed with high accuracy and ease compared to a case in which other materials are included. Furthermore, the first convex portion 51 including the material is preferable because it has excellent adhesion to the substrate 21 configured by glass and quartz. Note that the first convex portion 51 is preferably configured by one of or both silicon and silicon oxynitride, but other materials may be included at a content lower than the content of the silicon or silicon oxynitride, for example. Additionally, the first convex portion 51 may be configured by a material other than these materials.

Further, the fourth convex portion 54 is the same constituent material as that of the light shielding film 260, as described above, and includes a metal material such as metal, a metal silicide, a metal compound, and the like. Therefore, the fourth convex portion 54 can be formed at the same time as the formation of the light shielding film 260, and therefore, a relative position in plan view of the fourth convex portion 54 with respect to the light transmitting portion A11 and the wiring portion A12 can be easily and accurately determined compared to a case in which the fourth convex portion 54 is not formed at the same time.

Further, as described above, the first convex portion 51 protrudes from the substrate 21 toward the optical path adjustment layer 24, and the fourth convex portion 54 protrudes from the optical path adjustment layer 24 toward the wiring layer 20. According to this configuration, each of the contours of the first convex portion 51 and the fourth convex portion 54 in plan view can be easily and clearly ascertained, and thus, the relative position of the fourth convex portion 54 with respect to the first convex portion 51 can be easily and accurately determined.

Note that in the present embodiment, the "first mark" is the first convex portion 51, but it is sufficient that the "first mark" is disposed so as to be in contact with the light path adjustment layer 24 side of the substrate 21, and may be configured by a film including a color material or a fluorescent material disposed on the substrate 21, for example. In this case, for example, a groove or the like may be provided in the substrate 21, and the "first mark" may be formed by applying the film to the groove. Note that the same applies to the "second mark".

The substrate 21 includes the second concave portion 213 provided in the surface on the lens layer 22 side, and the first convex portion 51 is disposed at the second concave portion 213. The second concave portion 213 and the lens surface 212 are open to the surface of the substrate 21 on the +z axis side. By disposing the first convex portion 51 in the second concave portion 213, the relative position in plan view of the first convex portion 51 with respect to the lens surfaces 212 can be determined with high accuracy compared to a case in which the first convex portion 51 is disposed at a location other than in the second concave portion 213 of the substrate 21.

In addition, in the present embodiment, as described above, the element substrate 1 includes the protective layer 23 and the second convex portion 52 disposed on the optical path adjustment layer 24 side, as seen from the protective layer 23, so as to be in contact with the protective layer 23.

By including the second convex portion 52, the relative positional displacement in a plan view of the lens surface 212 and the light transmitting portion A11 can be reduced in the element substrate 1 provided with the protective layer 23. Specifically, by determining the relative positional relationship between the first convex portion 51 and the second convex portion 52 in plan view, the relative positional relationship between the second convex portion 52 and the lens surface 212 is determined. In addition, by determining the relative positional relationship in plan view between the third convex portion 53 and the fourth convex portion 54, the relative positional relationship in plan view between the third convex portion 53 and the light transmitting portion A11 is determined. Thus, a relative positional displacement of the lens surface 212 and the light transmitting portion A11 in plan view can be reduced.

Furthermore, in the present embodiment, the second convex portion 52 overlaps the first convex portion 51 in a plan view. Therefore, the relative position in a plan view of the second convex portion 52 with respect to the first convex portion 51 can be determined easily and with high accuracy compared to a case in which they do not overlap in plan view.

Note that the protective layer 23 may be omitted. When the protective layer 23 is omitted, the optical path adjustment layer 24 is disposed so as to be in contact with the substrate 21 and the lens layer 22. In this case, the second convex portion 52 and the third convex portion 53 may be omitted. When the protective layer 23, the second convex portion 52, and the third convex portion 53 are omitted, the first convex portion 51 and the fourth convex portion 54 may overlap in plan view. Compared to a case in which these are not overlapping, a relative position in a plan view of the fourth convex portion 54 with respect to the first convex portion 51 can be easily and accurately determined.

1-1e. Manufacturing Method for Electro-Optical Device 100

Figure 7:
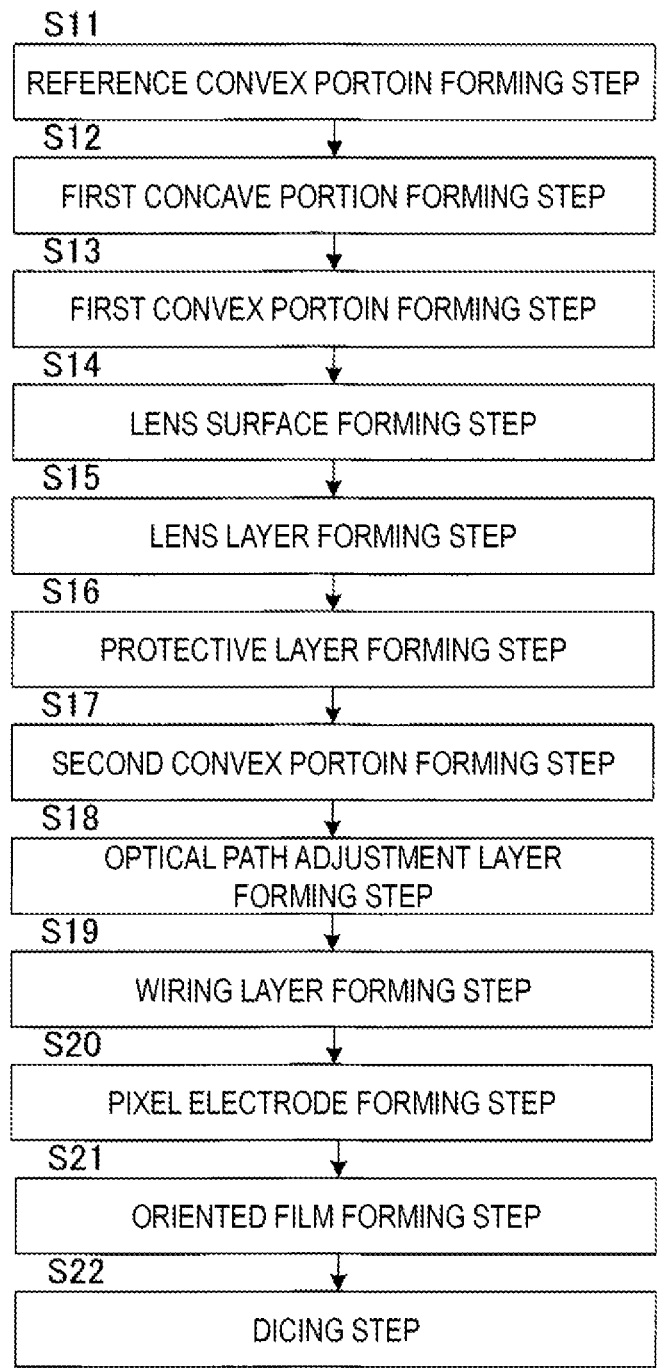
FIG. 7 is a flowchart illustrating a method for manufacturing the element substrate according to the first embodiment.

Next, a manufacturing method for the electro-optical device 100 will be described. First, a manufacturing method for the element substrate 1 provided in the electro-optical device 100 will be described. FIG. 7 is a flowchart illustrating the manufacturing method for the element substrate 1 according to the first embodiment. The manufacturing method for the element substrate 1 includes a reference convex portion forming step S11, a first concave portion forming step S12, a first convex portion forming step S13, a lens surface forming step S14, a lens layer forming step S15, a protective layer forming step S16, a second convex portion forming step S17, an optical path adjustment layer forming step S18, a wiring layer forming step S19, a pixel electrode forming step S20, an oriented film forming step S21, and a dicing step S22. The element substrate 1 can be obtained by sequentially performing each of the steps.

Figure 8:
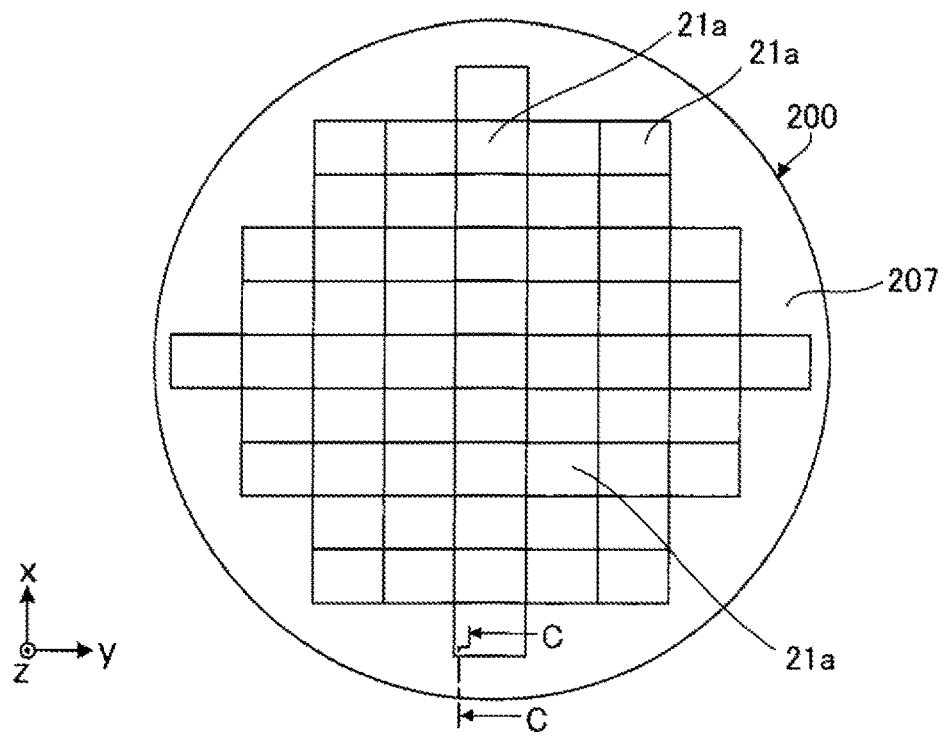
FIG. 8 is a schematic plan diagram illustrating a wafer used in the manufacturing of the element substrate according to the first embodiment.

FIG. 8 is a schematic plan diagram illustrating a wafer 200 used for manufacturing the element substrate 1 according to the first embodiment. The wafer 200 is an example of the "substrate". The wafer 200 is made of glass or quartz, for example. The wafer 200 includes a plurality of regions 21a. The wafer 200 is diced for each of the regions 21a in the dicing step S22, eventually resulting in the substrate 21. Placement of the plurality of regions 21a is not limited to the illustrated example, and is optional.

Each of the steps will be sequentially described below with reference to FIGS. 9 to 20. FIGS. 9 to 20 each illustrate a diagram corresponding to the cross-sectional diagram taken along a line C-C in FIG. 8.

Reference Convex Portion Forming Step S11

Figure 9:
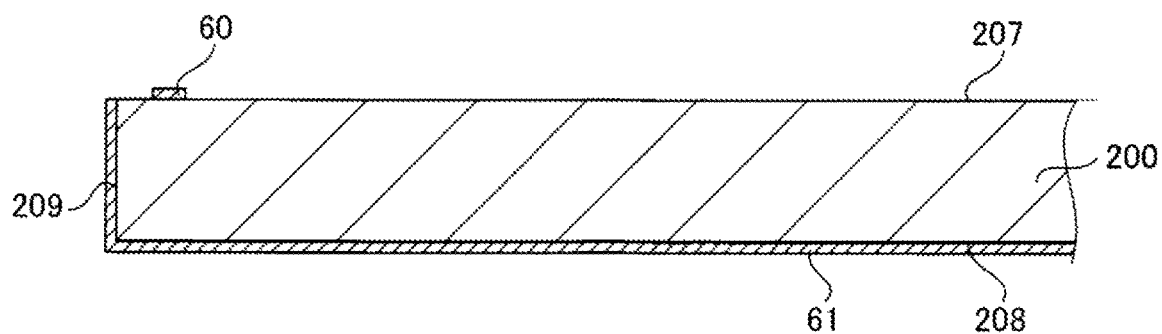
FIG. 9 is a cross-sectional diagram for describing a substrate convex portion forming step according to the first embodiment.

FIG. 9 is a cross-sectional diagram for illustrating the reference convex portion forming step S11 according to the first embodiment. As illustrated in FIG. 9, the wafer 200 includes a first surface 207, a second surface 208, and side surfaces 209 connecting them. In the reference convex portion forming step S11, a conductive layer 61 is formed on the second surface 208 and the side surfaces 209, and a reference convex portion 60 is formed on the first surface 207.

Specifically, first, a silicon film is formed on the first surface 207, the second surface 208, and the side surfaces 209 by an evaporation method such as the chemical vapor deposition (CVD) method, for example. Next, the silicon film is flattened by flattening treatment using the chemical mechanical polishing (CMP) method or the like. Subsequently, a portion of the silicon film is removed by dry etching, such as reactive ion etching (RIE), for example, using fluorine gas as reactant gas, with a resist mask. With this treatment, the conductive layer 61 and the reference convex portion 60 illustrated in FIG. 9 are formed. Forming the conductive layer 61 enables the wafer 200 to be fixed to a base plate in the dry etching device by electrostatic adsorption. The reference convex portion 60 serves as a reference for determining placement of the first concave portion 211 and the second concave portion 213 in each of the regions 21a in a subsequent step.

The conductive layer 61 is formed using a silicon film in the present embodiment, so that the conductive layer 61 has a Poisson's ratio larger than a Poisson's ratio of the wafer 200 made of quartz or glass. Thus, the conductive layer 61 has a function of reinforcing the wafer 200. Accordingly, providing the conductive layer 61 enables suppressing deformation of the wafer 200 due to annealing treatment performed in a subsequent step compared to a case in which the conductive layer 61 is not provided. While the conductive layer 61 is not particularly limited in thickness, it can have a thickness of approximately 3500 Å, for example.

The reference convex portion 60 may be provided for each of the regions 21a or may not be provided for each of the regions 21a. The reference convex portion 60 also may be provided outside the regions 21a. However, two or more reference convex portions 60 may be provided. In the present embodiment, the position adjustment portion 5 formed in a subsequent step is provided for each of the regions 21a.

While in the drawings, an angle formed between the first surface 207 and each of the side surfaces 209, and an angle formed between the second surface 208 and each of the side surfaces 209, are 90 degrees, each of the angles may be an acute angle or an obtuse angle. In addition, a connecting portion between the first surface 207 and each of the side surfaces 209, and a connecting portion between the second surface 208 and each of the side surfaces 209, may each have a radius of curvature.

First Concave Portion Forming Step S12

Figure 10:
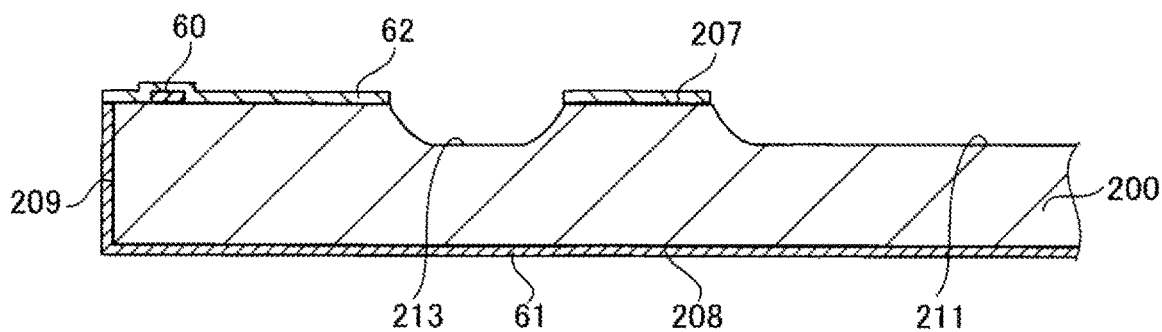
FIG. 10 is a cross-sectional diagram for describing a first concave portion forming step according to the first embodiment.

FIG. 10 is a cross-sectional diagram for illustrating the first concave portion forming step according to the first embodiment. In the first concave portion forming step S12, first, a surface protective film 62 composed of a silicon oxide film, for example, is formed on the first surface 207 by an evaporation method such as the plasma CVD or the like, and then the annealing treatment is performed. Next, a resist mask having a plurality of portions to be opened corresponding to the first concave portion 211 and the second concave portion 213 is formed, and the resist mask is used to remove a part of the surface protective film 62 and the wafer 200 by etching. These treatments form the first concave portion 211 and the second concave portion 213 illustrated in FIG. 10.

Performing the annealing treatment described above enables removing residual stress in the wafer 200 caused by treatment in a previous step, and warping of the wafer 200 can be suppressed. In addition, providing the surface protective film 62 enables reducing occurrence of warping in the wafer 200 due to the annealing treatment. The etching described above is wet etching using an etchant containing hydrofluoric acid, for example. The etching may be dry etching.

In addition, in the formation of the resist mask described above, a plurality of openings corresponding to the first concave portion 211 and the second concave portion 213 is formed by disposing a mask for exposure with reference to the reference convex portion 60. The mask for exposure is installed having a predetermined positional relationship with respect to the reference convex portion 60. Using the reference convex portion 60 as a reference enables determining a relative positional relationship in plan view between the first concave portion 211 and the second concave portion 213 with respect to the region 21a. Thus, for each of the regions 21a, the first concave portion 211 and the second concave portion 213 can be formed at a target position in the corresponding one of the regions 21a.

First Convex Portion Forming Step S13

Figure 11:
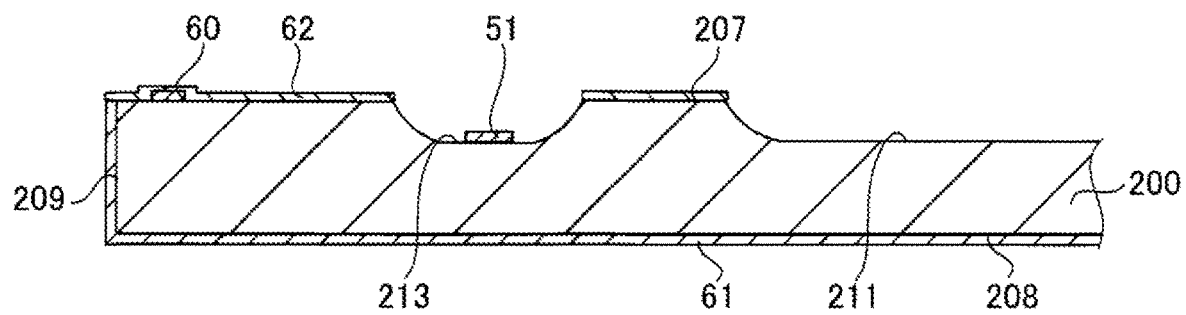
FIG. 11 is a cross-sectional diagram for describing a first convex portion forming step according to the first embodiment.

FIG. 11 is a cross-sectional diagram for explaining the first convex portion forming step. In the first convex portion forming step S13, the first convex portion 51 is formed on a bottom surface of the second concave portion 213. Specifically, first, a silicon film is formed on the first surface 207 by an evaporation method such as the CVD method. Next, a resist mask having a portion to be opened corresponding to the shape of the first convex portion 51 is formed, and the resist mask is used to remove a part of the silicon film by dry etching, such as RIE, in which fluorine gas is used as reaction gas, for example. These treatments form the first convex portion 51 illustrated in FIG. 11.

In the formation of the resist mask described above, the opening corresponding to the first convex portion 51 is formed by disposing the mask for exposure with respect to the opening edge 2130 of the second concave portion 213. Specifically, the portion to be opened the resist mask, corresponding to the first convex portion 51, is formed having a geometric center in plan view, coinciding with the geometric center O10 of the region enclosed by the opening edge 2130 of the second concave portion 213. At this time, when planar shapes of the opening of the resist mask and the region surrounded by the opening edge 2130 of the second concave portion 213 are similar, the opening of the resist mask is formed to have sides constituting each of the planar shapes, the sides being parallel to each other. Forming the first convex portion 51 with respect to the second concave portion 213 enables determining a relative position of the first convex portion 51 in plan view with respect to the first concave portion 211.

In the present step, the flattening treatment using CMP or the like may be performed after the silicon film is formed. For example, when the first convex portion 51 is formed of a metal material, the first convex portion 51 may be formed by a method for performing reflow treatment by heating.

Lens Surface Forming Step S14

Figure 12:
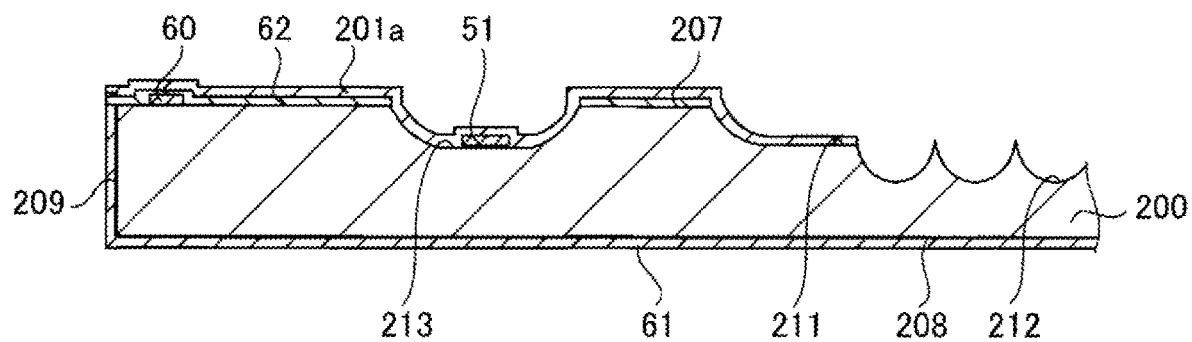
FIG. 12 is a cross-sectional diagram for describing a lens surface forming step according to the first embodiment.

FIG. 12 is a cross-sectional diagram for illustrating the lens surface forming step according to the first embodiment. In the lens surface forming step S14, first, a first protective film 201a composed of a silicon oxide film, for example, is formed on the first surface 207 by an evaporation method such as the plasma CVD or the like, and then the annealing treatment is performed. Next, a resist mask having a plurality of portions to be opened corresponding to the plurality of lens surfaces 212 is formed, and the resist mask is used to remove a part of the first protective film 201a and the wafer 200 by isotropic etching. These treatments form the plurality of lens surfaces 212 each having a concave curved surface illustrated in FIG. 12. The first protective film 201a ultimately becomes the first protective film 201 via a subsequent step.

In the isotropic etching described above, wet etching is used using an etchant containing hydrofluoric acid. Dry etching may be used for the isotropic etching of the present step. In addition, performing the annealing treatment described above enables removing residual stress in the wafer 200 caused by the treatment in the previous step, so that warping of the wafer 200 can be suppressed. Furthermore, providing the first protective film 201a enables reducing occurrence of warping in the wafer 200 due to the annealing treatment.

In the formation of the resist mask described above, the plurality of openings corresponding to the plurality of lens surfaces 212 are formed by disposing a mask for exposure with respect to the first convex portion 51. Using the first convex portion 51 as a reference allows a relative position of each of the lens surfaces 212 in plan view with respect to the first convex portion 51 to be determined. In addition, a relative position of each of the plurality of lens surfaces 212 with respect to the first concave portion 211 is also determined.

Lens Layer Forming Step S15

Figure 13:
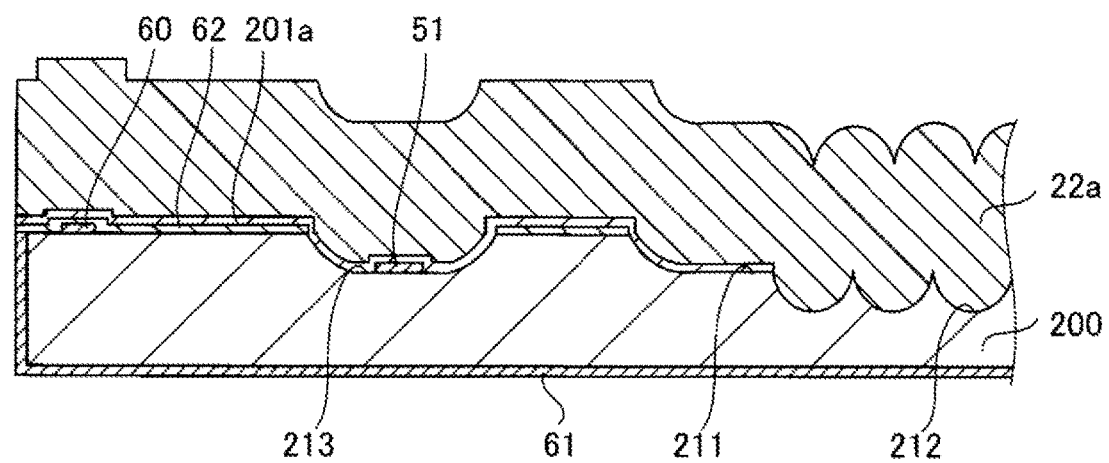
FIG. 13 is a cross-sectional diagram for describing a lens layer forming step according to the first embodiment.
Figure 14:
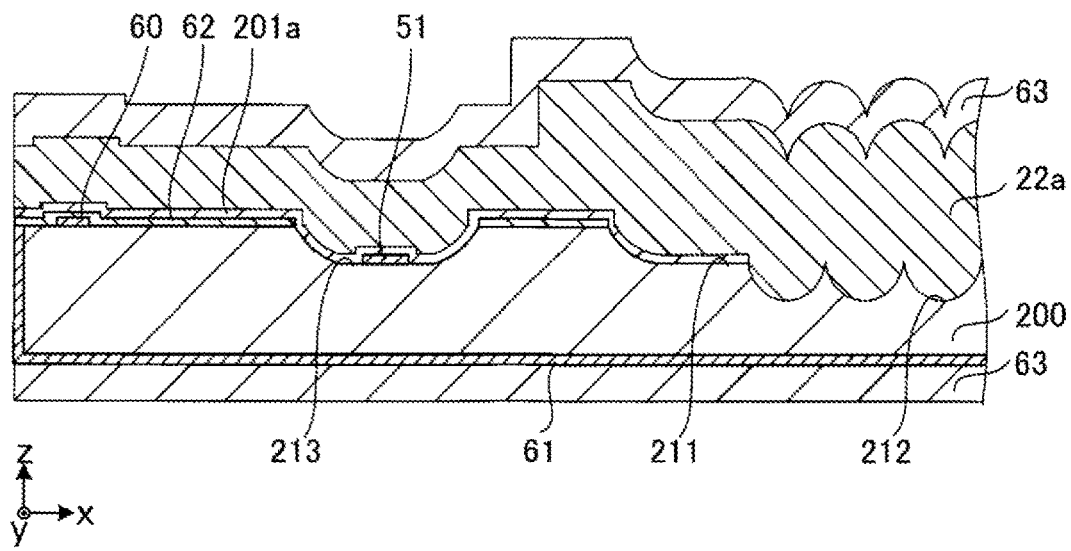
FIG. 14 is a cross-sectional diagram for describing the lens layer forming step according to the first embodiment.
Figure 15:
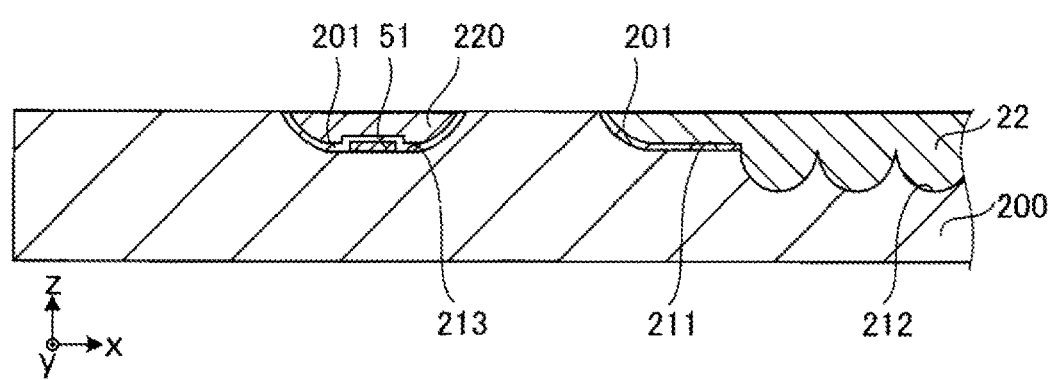
FIG. 15 is a cross-sectional diagram for describing the lens layer forming step according to the first embodiment.

FIGS. 13 to 15 are each a cross-sectional diagram for illustrating the lens layer forming step according to the first embodiment. In the lens layer forming step S15, first, a lens layer-forming film 22a composed of a silicon oxynitride film is formed on the first surface 207 by an evaporation method such as CVD, for example, as illustrated in FIG. 13. Next, as illustrated in FIG. 14, after a part of the lens layer-forming film 22a is removed by dry etching, an insulating film 63 containing tetraethyl orthosilicate (TEOS) is formed on the lens layer-forming film 22a. The insulating film 63 is also formed on the conductive layer 61 on a second surface 208 side. Subsequently, as illustrated in FIG. 15, the lens layer 22, the filling layer 220, and the first protective film 201 are formed by performing the flattening treatment using a CMP method or the like on the insulating film 63 and the lens layer-forming film 22a. The flattening treatment using a CMP method or the like is also performed on the insulating film 63 and the conductive layer 61 to remove them.

Protective Layer Forming Step S16

Figure 16:
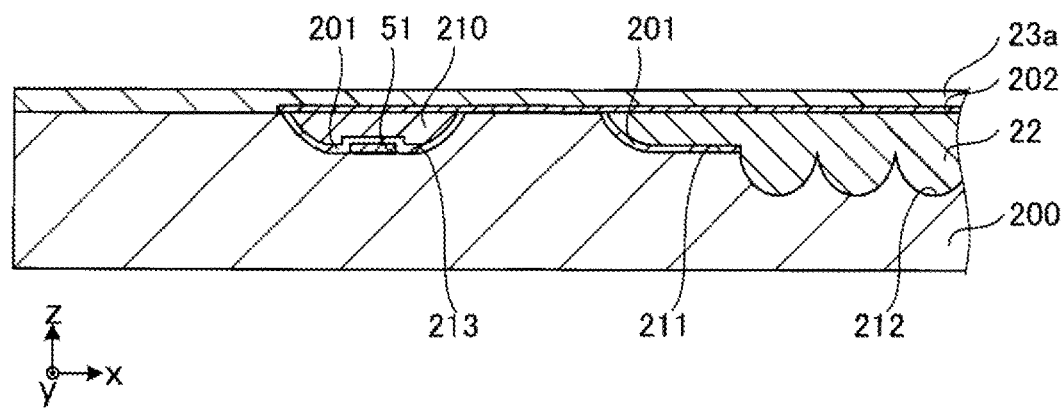
FIG. 16 is a cross-sectional diagram for describing a protective layer forming step according to the first embodiment.

FIG. 16 is a cross-sectional diagram for illustrating the protective layer forming step according to the first embodiment. In the protective layer forming step S16, first, the second protective film 202 composed of a silicon nitride film, for example, is formed on the lens layer 22 and the filling layer 220 by an evaporation method such as CVD, and etching or the like. Next, a protective layer 23a composed of a silicon oxide film, for example, is formed on the first surface 207 by an evaporation method such as CVD, a CMP method, or the like, while covering the second protective film 202. The protective layer 23a is a layer that is ultimately diced into the protective layer 23.

Providing the second protective film 20 enables suppressing deformation of the wafer 200 due to annealing treatment performed in a subsequent step compared to when the second protective film 20 is not provided. In addition, forming the protective layer 23 enables protecting the lens layer 22 so that the surface of the lens layer 22 is not removed by etching performed in a subsequent step.

Second Convex Portion Forming Step S17

Figure 17:
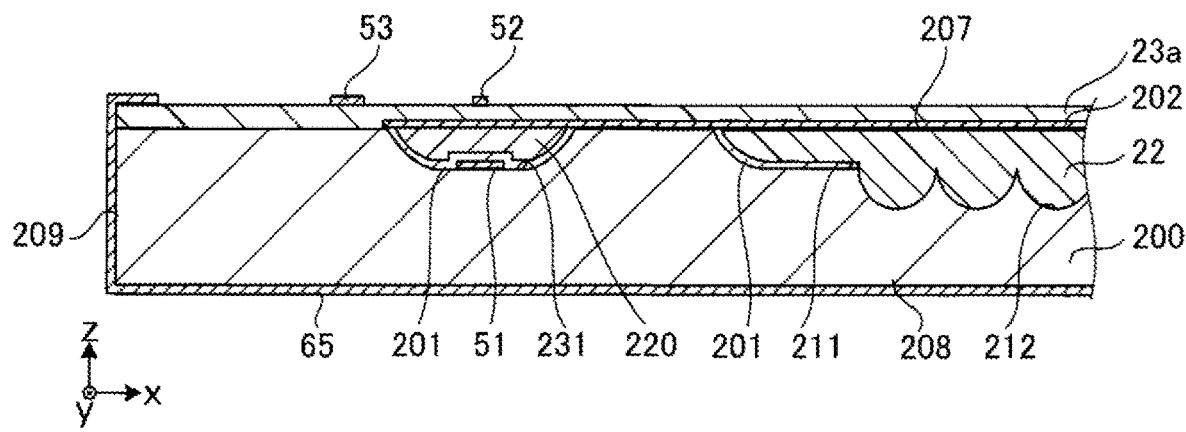
FIG. 17 is a cross-sectional diagram for describing a second convex portion forming step according to the first embodiment.

FIG. 17 is a cross-sectional diagram for illustrating the second convex portion forming step according to the first embodiment. In the second convex portion forming step S17, the second convex portion 52 and the third convex portion 53 are formed on the protective layer 23. Specifically, a silicon film is formed on the protective layer 23, the second surface 208, and the side surfaces 209 by an evaporation method such as the CVD method. Next, the silicon film is flattened by flattening treatment using the CMP method or the like. Next, a resist mask having a plurality of portions to be opened corresponding to the shapes of the second convex portion 52 and the third convex portion 53 is formed, and the resist mask is used to remove a part of the silicon film by dry etching, such as RIE, in which fluorine gas is used as reaction gas, for example. These treatments form the second convex portion 52 and the third convex portion 53 illustrated in FIG. 17. These treatments also enables obtaining a reinforcing layer 65 disposed throughout the second surface 208, the side surfaces 209, and a part of the first surface 207.

Forming the reinforcing layer 65 enables suppressing deformation of the wafer 200 warped with the first surface 207 protruding, when the TFT 26 or the like provided in the wiring layer 20 is formed. While the reinforcing layer 65 is not particularly limited in thickness, it may have a thickness larger than that of the conductive layer 61 described above, and can have a thickness of approximately 4500 Å, for example.

In the formation of the resist mask described above, the plurality of portions to be opened corresponding to the second convex portion 52 and the third convex portion 53 is formed by disposing a mask for exposure with respect to the first convex portion 51. Specifically, the opening of the resist mask, corresponding to the second convex portion 52, is formed having a geometric center in plan view, coinciding with the geometric center O1 of the first convex portion 51. At this time, when planar shapes of the opening of the resist mask and the first convex portion 51 are similar, the opening of the resist mask is formed having sides constituting each of the planar shapes, the sides being parallel to each other. Forming the second convex portion 52 and the third convex portion 53 with respect to the first convex portion 51 enables determining a relative position of each of the second convex portion 52 and the third convex portion 53 in plan view with respect to the lens surfaces 212.

The first convex portion 51 has a light transmittance lower than each of light transmittances of the wafer 200, the first protective film 201, the filling layer 220, and the protective layer 23. Thus, a contour of the first convex portion 51 in plan view is facilitated to be grasped using an optical microscope or the like, for example. This facilitates determining a relative position of the second convex portion 52 in plan view with respect to the first convex portion 51.

When the second convex portion 52 and the third convex portion 53 are each formed of a metal material, for example, the first convex portion 51 may be formed by a method for performing reflow treatment by heating. While in the present embodiment, the first convex portion 51 and the second convex portion 52 overlap with each other in plan view, they may not overlap with each other. For example, a relative positional relationship between the first convex portion 51 and the second convex portion 52 may be defined by determining a clearance between them in plan view.

Optical-Path Adjusting Layer Forming Step S18

Figure 18:
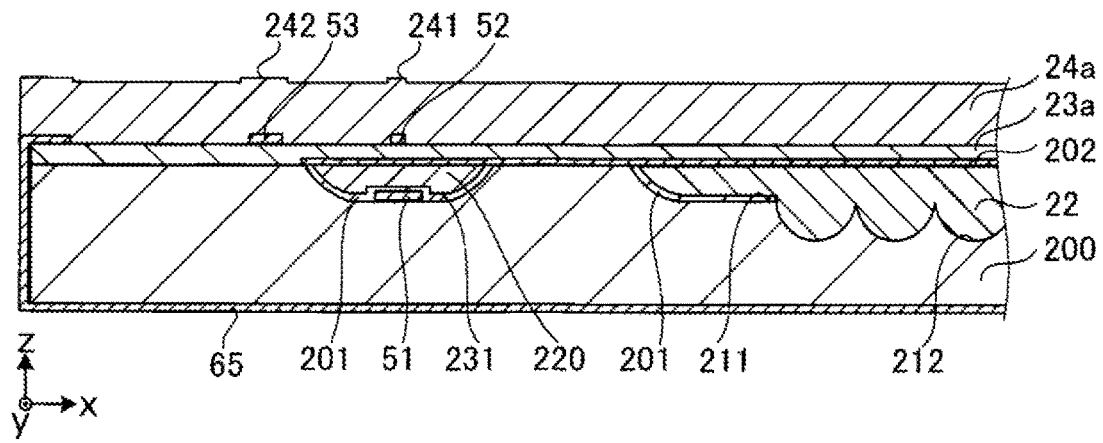
FIG. 18 is a cross-sectional diagram for describing an optical path adjustment layer forming step according to the first embodiment.

FIG. 18 is a cross-sectional diagram for illustrating the optical path adjustment layer forming step according to the first embodiment. In the optical path adjustment layer forming step S18, an optical path adjustment layer 24a composed of a silicon oxide film, for example, is formed on the protective layer 23 by an evaporation method such as CVD or the like. The optical path adjustment layer 24a is a layer that is ultimately diced into the optical path adjustment layer 24.

The optical path adjustment layer 24 has a thickness that is set adjusting a condensing position of optical LL passing through each of the lens surfaces 212 to a desired position other than the light transmitting portion A11, based on the shape of the lens surface 212, and a refractive index or the like of each of the wafer 200 and the lens layer 22.

The optical path adjustment layer 24 is provided on its surface on a +z-axis side with the first portion 241 having a shape following the shape of the second convex portion 52, and second portion 242 having a shape following the shape of the third convex portion 53.

Wiring Layer Forming Step S19

Figure 19:
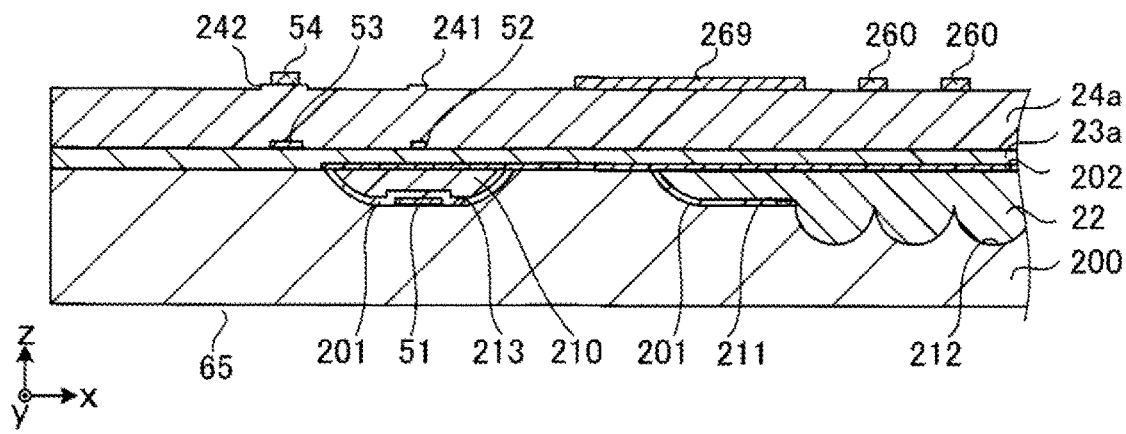
FIG. 19 is a cross-sectional diagram for describing a wiring layer forming step according to the first embodiment.
Figure 20:
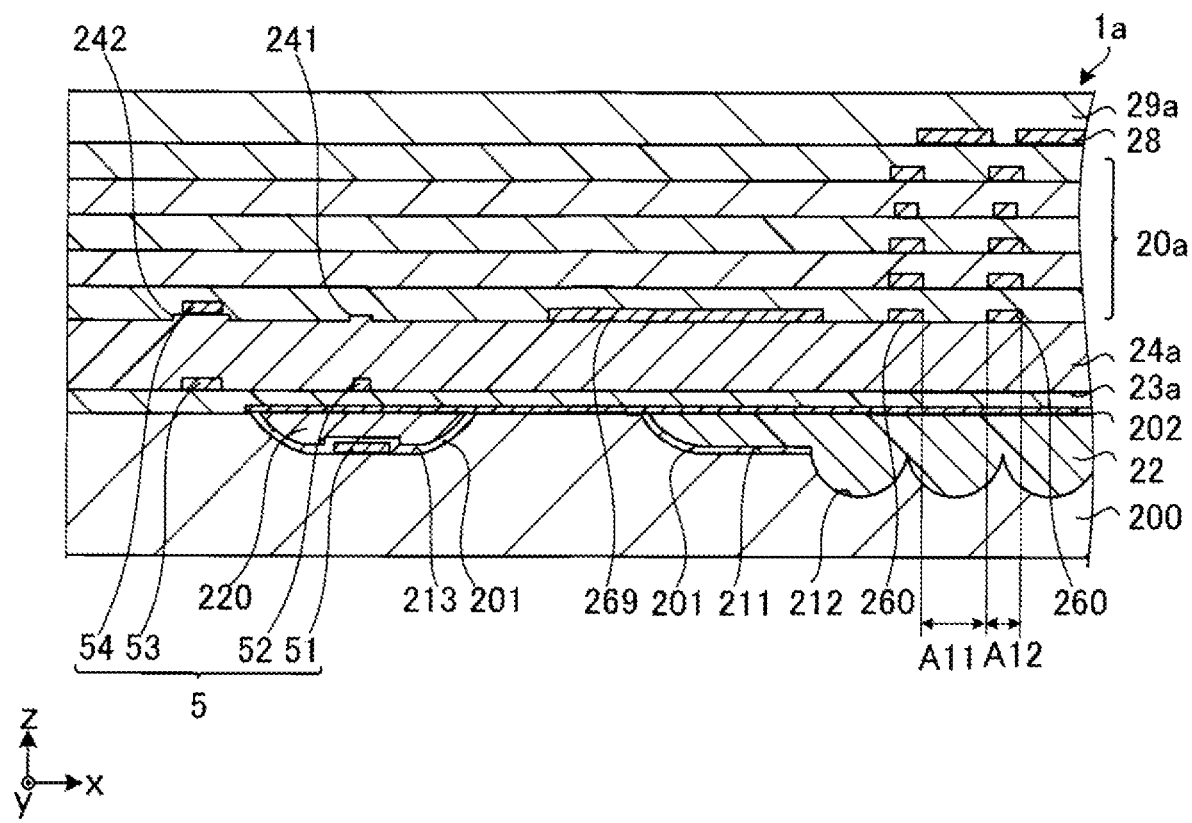
FIG. 20 is a cross-sectional diagram for describing the wiring layer forming step, a pixel electrode forming step, and an oriented film forming step according to the first embodiment.

FIG. 19 is a cross-sectional diagram for illustrating the wiring layer forming step S19 according to the first embodiment. FIG. 20 is a cross-sectional diagram for illustrating the wiring layer forming step S19, the pixel electrode forming step 20, and the oriented film forming step S21, according to the first embodiment. The wiring line layer forming step S19 includes a step of forming the wiring layer 20a and a step of forming the fourth convex portion 54. In other words, in the wiring line layer forming step S19, the fourth convex portion 54 is formed along with the wiring layer 20a. The wiring layer 20a is a layer that is ultimately diced into the wiring layer 20.

Specifically, the fourth convex portion 54, the light-shielding film 260, the light-shielding film 269, the scanning line 261, the capacitance line 263, the TFT 25, and the signal line 262 are each formed such that a metal film is formed by a sputtering method or an evaporation method, for example, and then etching is performed on the metal film using a resist mask. The insulator 25 includes layers that are each formed subjected to flattening treatment by an evaporation method, polishing such as CMP, or the like.

As illustrated in FIG. 19, the fourth convex portion 54 and the light-shielding film 260 are collectively formed by etching using the same resist mask. Accordingly, a relative position in plan view of the fourth convex portion 54 with respect to the light-shielding film 260 is determined.

In the formation of the resist mask, a plurality of portions to be opened corresponding to the fourth convex portion 54 and the light-shielding film 260 is formed by disposing a mask for exposure with respect to the second portion 242. Specifically, the opening of the resist mask, corresponding to the fourth convex portion 54, is formed having the geometric center O4 in plan view, coinciding with the geometric center O5 of the second portion 242. At this time, when planar shapes of the opening of the resist mask and the second portion 242 are similar, the opening of the resist mask is formed having sides constituting each of the planar shapes, the sides being parallel to each other. Forming the fourth convex portion 54 and the light-shielding film 260 with respect to the second portion 242 enables determining a relative position of the light transmitting portion A11 in plan view with respect to the lens surfaces 212.

The fourth convex portion 54 has an optical transmittance lower than an optical transmittance of the optical path adjustment layer 24. Thus, a contour of the fourth convex portion 54 in plan view is facilitated to be grasped using an optical microscope or the like, for example. This facilitates determining a relative position of the fourth convex portion 54 in plan view with respect to the second portion 242.

The scanning line 261, the capacitance line 263, the TFT 25, and the signal line 262 are formed sequentially with reference to the light shielding film 260. The reinforcing layer 65 formed on the second surface 208 is removed in the present step or a subsequent step. In the drawings subsequent to FIG. 19, a part of the reinforcing layer 650 formed on the first surface 207 is not illustrated.

Pixel Electrode Forming Step 20

In the pixel electrode forming step S20, the pixel electrode 28 is formed on the light transmitting portion A11 of the wiring layer 20, although not illustrated in detail. The pixel electrode 28 is formed such that a layer made of a transparent conductive material, for example, is formed using an evaporation method such as a CVD method, and then the layer is patterned using a mask.

Oriented Film Forming Step S21

In the oriented film forming step S21, an oriented film 29a is formed such that a layer made of polyimide, for example, is formed using an evaporation method such as a CVD method, and then rubbing treatment is performed on the layer. The oriented film 29a is a layer that is ultimately diced into the oriented film 29.

The mother substrate 1a illustrated in FIG. 20, which is an example of the "electro-optical device manufacturing member" for forming the plurality of electro-optical devices 100, from the reference convex portion forming step S11 to the oriented film forming step S21, is formed.

Dicing Step S22

In the dicing step S22, although not illustrated in detail, the mother substrate 1a is divided into each of the regions 21a illustrated in FIG. 5. A plurality of dicedelement substrates 1 is obtained by being divided. As described above, the element substrate 1 illustrated in FIG. 4 can be formed.

The counter substrate 7 is formed by appropriately using a publicly known technique, and the counter substrate 7 is bonded to the element substrate 1 with the sealing member 8 interposed therebetween. Subsequently, a liquid crystal material is injected between the element substrate 1, the counter substrate 7, and the sealing member 8 to form the liquid crystal layer 9 and to be then sealed. In addition, a various types of circuit and the like are appropriately formed in the corresponding steps described above or between the corresponding steps. As described above, the liquid crystal display device 100 illustrated in FIGS. 1 and 2 can be manufactured.

As described above, the manufacturing method for the element substrate 1 includes the first convex portion forming step S13, the lens surface forming step S14, the lens layer forming step S15, the optical path adjustment layer forming step S18, the wiring layer forming step S19, and the pixel electrode forming step S20. In the first convex portion forming step S13, the first convex portion 51 that is transmissive and is in contact with the wafer 200 is formed. In the lens surface forming step S14, the lens surfaces 212 each having a concave curved surface shape are formed on the first surface 207 of the wafer 200. In the lens layer forming step S15, the lens layer 22 being transmissive is formed on the lens surfaces 212. In the optical path adjustment layer forming step S18, the optical path adjustment layer 24 is formed on the side opposite to the lens surfaces 212 of the lens layer 22. The wiring layer forming step S19 includes the step of forming the wiring layer 20 and the step of forming the fourth convex portion 54, and a part of each of the steps is performed at the same time according to the present embodiment. In the step of forming the wiring layer 20, the wiring layer 20 including the light transmitting portion A11 and the wiring portion A12 disposed around the light transmitting portion A11 in plan view is formed on a side opposite to the lens layer 22 from the optical path adjustment layer 24. In the step of forming the fourth convex portion 54, the fourth convex portion 54 in contact with the optical path adjustment layer 24 is formed on a side opposite to the substrate 21 from the optical path adjustment layer 24. In the pixel electrode forming step S20, the pixel electrode 28 being transmissive that overlaps the light transmitting portion A11 in plan view and is electrically coupled to the scanning line 261, the capacitance line 263, the signal line 262, and the like is formed on a side opposite to the optical path adjustment layer 24 from the wiring layer 20.

According to the manufacturing method for the element substrate 1, as described above, the first convex portion 51 formed on the wafer 200 and the fourth convex portion 54 positioned on the same layer as a part of the wiring layer 20 can be formed. Thus, using each of the convex portions as a reference for positioning enables the lens surfaces 212 and the light transmitting portion A11 to be relatively positioned in plan view with high accuracy.

As described above, the plurality of element substrates 1 is formed by dicing the mother substrate 1a. The mother substrate 1a includes the wafer 200, the lens layer 22 having the lens surfaces 212, the optical path adjustment layer 24a, the wiring layer 20a, and the pixel electrode 28. The wiring layer 20a is disposed in contact with the optical path adjustment layer 24, and includes the light transmitting portion A11 and the wiring portion A12. Then, the first convex portion 51 is disposed between the wafer 200 and the optical path adjustment layer 24a, in contact with the wafer 200, and the fourth convex portion 54 is disposed between the optical path adjustment layer 24a and the wiring layer 20a, in contact with the optical path adjustment layer 24a. In each of the plurality of element substrates 1 formed by dicing the mother substrate 1a described above, relative positional displacement in plan view between the lens surfaces 212 and the pixel electrode 28 is reduced. Accordingly, efficiency of use of light for the plurality of element substrates 1 can be improved.

While in the present embodiment, the position adjustment portion 5 is provided for each of the regions 21a, it may not be provided for each of the regions 21a. The position adjustment portion 5 may be also provided outside the regions 21a. In other words, each of the element substrates 1 diced may not include the position adjustment portion 5. However, two or more position adjustment portions 5 may be provided on the first surface 207.

1-2. Second Embodiment

Figure 21:
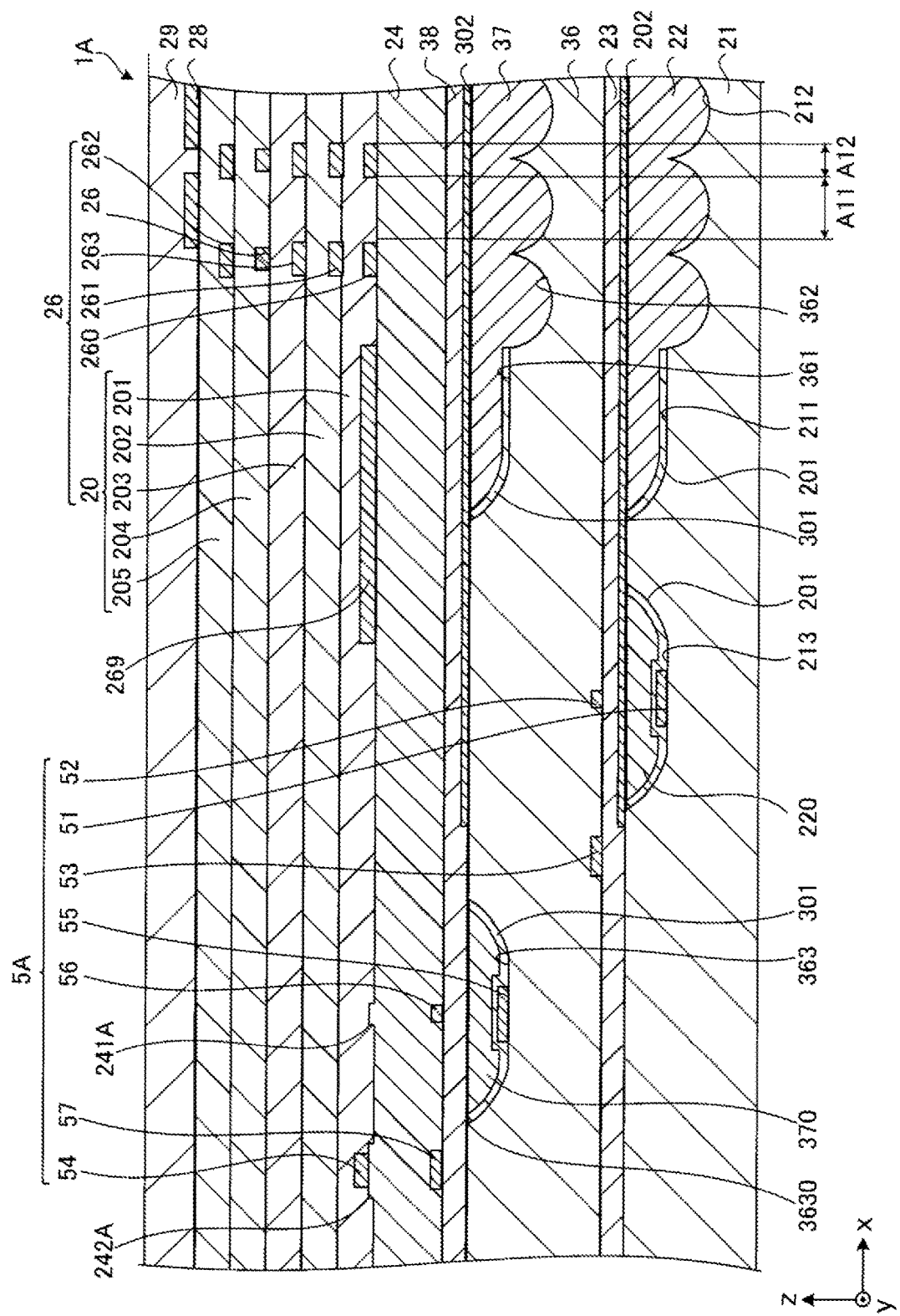
FIG. 21 is a schematic cross-sectional diagram illustrating a configuration of an element substrate according to a second embodiment.
Figure 22:
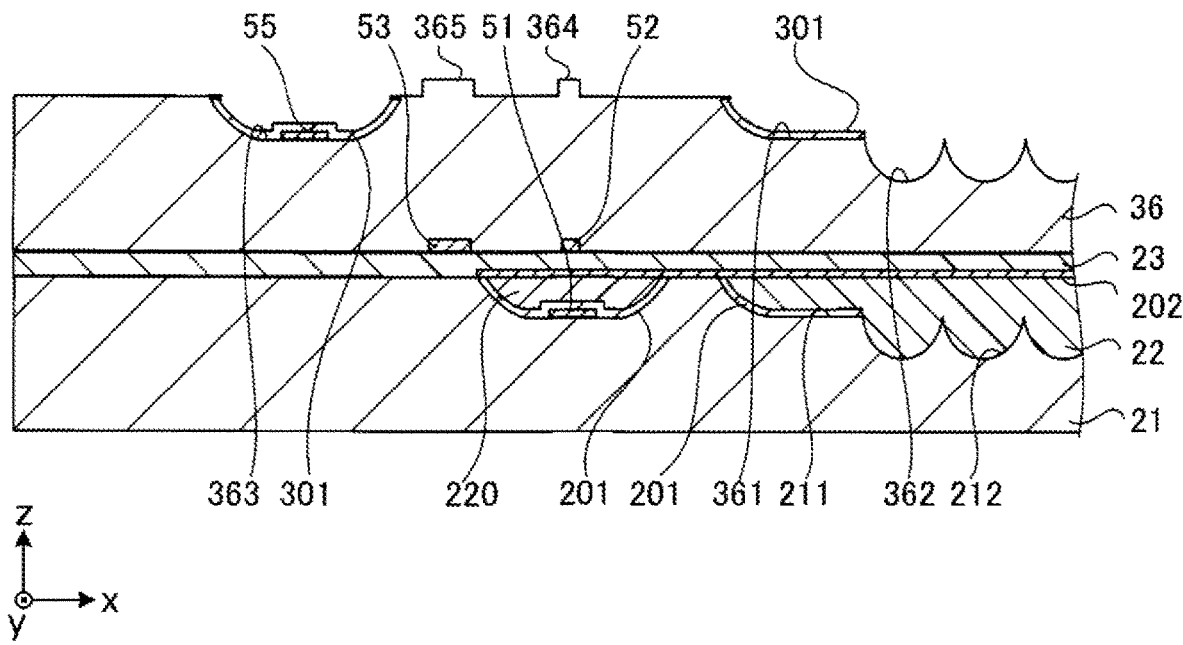
FIG. 22 is a cross-sectional diagram for describing a method for manufacturing the element substrate according to the second embodiment.
Figure 23:
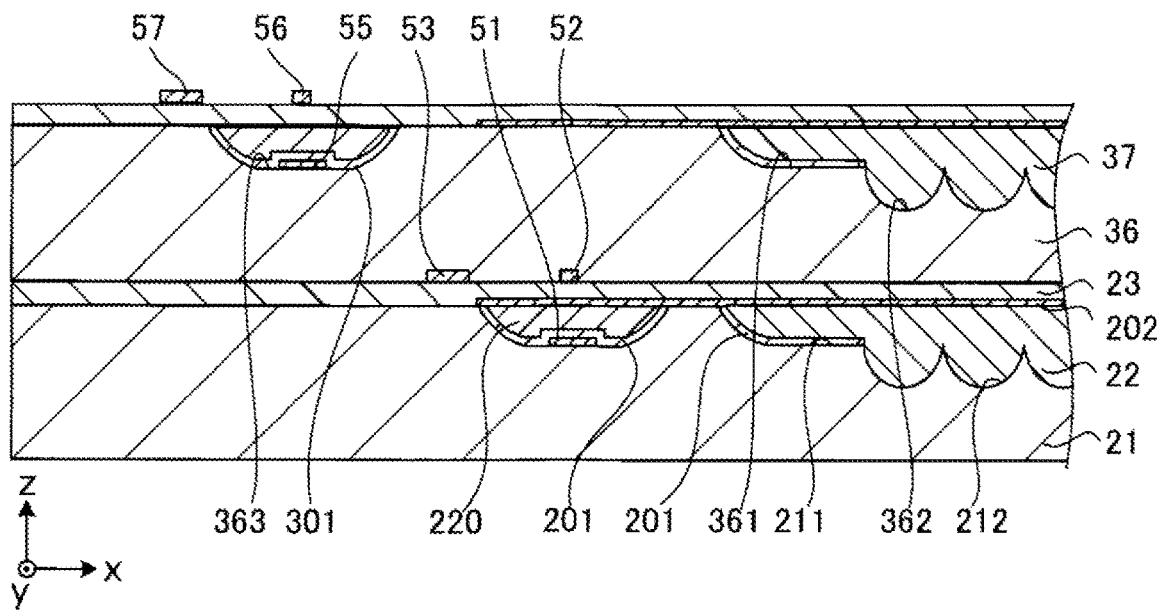
FIG. 23 is a cross-sectional diagram for describing the method for manufacturing the element substrate according to the second embodiment.

Next, a second embodiment of the present disclosure will be described. FIG. 21 is a schematic cross-sectional diagram illustrating structure of an element substrate 1A according to the second embodiment. FIGS. 22 and 23 are each a cross-sectional diagram for illustrating a manufacturing method for the element substrate 1A according to the second embodiment. The present embodiment is different from the first embodiment in structure of the element substrate 1A. In the second embodiment, detailed description of each of the same matters as those of the first embodiment will be appropriately eliminated by using the reference signs used in the description of the first embodiment.

The element substrate 1A illustrated in FIG. 21 further includes an insulating layer 36, a second lens layer 37, and a second protective layer 38. The insulating layer 36, the second lens layer 37, and the second protective layer 38 are disposed between the protective layer 23 and the optical path adjustment layer 24, and are arrayed in this order from the protective layer 23 toward the optical path adjustment layer 24. The position adjustment portion 5A further includes a fifth convex portion 55, a sixth convex portion 56, and a seventh convex portion 57.

Insulating Layer 36

The insulating layer 36 is formed similar to the substrate 21 except that the constituent material thereof is silicon oxide, for example. In other words, the insulating layer 36 includes a third concave portion 361, and a fourth concave portion 363 positioned outward of the third concave portion 361 in plan view. The third concave portion 361 is provided on its bottom surface with a plurality of second lens surfaces 362 each with a concave curved surface shape. The fourth concave portion 363 is disposed with the fifth convex portion 55. In addition, a part of the third concave portion 361, and the fourth concave portion 363 are disposed with a third protective film 301 composed of a silicon oxide film, for example. The third protective film 301 is disposed covering the fifth convex portion 55 to protect the fifth convex portion 55. The third protective film 301 may be omitted.

The first concave portion 211 and the third concave portion 361 overlap with each other in plan view. Additionally, the lens surfaces 212 and the second lens surfaces 362 overlap with each other in plan view. While in the drawings, the second concave portion 213 and the fourth concave portion 363 do not overlap with each other in plan view, they may overlap with each other.

Second Lens Layer 37

The second lens layer 37 is formed similar to the lens layer 22. In other words, the second lens layer 37 is disposed on the insulating layer 36 in contact with the second lens surfaces 362, while filling the third concave portion 361. The second lens surface 362 and the second lens layer 37 constitute a lens. In the present embodiment, the second lens layer 37 has a refractive index larger than a refractive index of the insulating layer 36.

In addition, a second filling layer 370 is disposed at the fourth concave portion 363 described above. The second filling layer 370 is formed similar to the filling layer 220. In other words, the second filling layer 370 is disposed in contact with the third protective film 301, while filling the fourth concave portion 363. In addition, a fourth protective film 302 composed of a silicon nitride film, for example, is disposed on the second lens layer 37 and the filling layer 220. The fourth protective film 302 is formed similar to the second protective film 202. The fourth protective film 302 may be omitted.

Second Protective Layer 38

The second protective layer 38 is formed similar to the protective layer 23. The protective layer 23 is disposed on the insulating layer 36 to protect the second lens layer 37.

Fifth Convex Portion 55

The fifth convex portion 55 is formed similar to the first convex portion 51. The fifth convex portion 55 is disposed in contact with the insulating layer 36, while protruding from the insulating layer 36 toward the second protective layer 38.

سixth Convex Portion 56

The sixth convex portion 56 is formed similar to the second convex portion 52. The sixth convex portion 56 is disposed in contact with the second protective layer 38, while protruding from the second protective layer 38 toward the optical path adjustment layer 24. The sixth convex portion 56 overlaps the fifth convex portion 55 in plan view. The sixth convex portion 56 has a planar area smaller than a planar area of the fifth convex portion 55. The sixth convex portion 56 has a geometric center in plan view that coincides with a geometric center of the fifth convex portion 55 in plan view. The fourth concave portion 363 has a second opening edge 3630 that is rectangular in plan view. The fifth convex portion 55 has a geometric center in plan view that coincides with a geometric center of a region surrounded by the second opening edge 3630 in plan view. In addition, each of planar shapes of the region surrounded by the second opening edge 3630 of the fourth concave portion 363, the fifth convex portion 55, and the sixth convex portion 56, is substantially similar, and sides constituting the planar shape are parallel to each other.

Seventh Convex Portion 57

The seventh convex portion 57 is formed similar to the third convex portion 53. In other words, the seventh convex portion 57 is disposed in contact with the second protective layer 38, while protruding from the second protective layer 38 toward the optical path adjustment layer 24. The seventh convex portion 57 is disposed on the same plane as the sixth convex portion 56. The seventh convex portion 57 has a planar area larger than the planar area of the sixth convex portion 56. In the present embodiment, the optical path adjustment layer 24 includes a first portion 241A having a shape following the shape of the sixth convex portion 56, and a second portion 242A having a shape following the shape of the seventh convex portion 57.

Next, a manufacturing method for the element substrate 1A will be described. The manufacturing method for the element substrate 1A according to the present embodiment includes an insulating layer forming step, a third concave portion forming step, a fifth convex portion forming step, a second lens surface forming step, a second lens layer forming step, and a second protective layer forming step. These steps are performed in this order between the second convex portion forming step S17 and the optical path adjustment layer forming step S18 illustrated in FIG. 7.

In the insulating layer forming step, after a silicon oxide film is formed on the protective layer 23 by an evaporation method such as the CVD method, the insulating layer 36 is formed by performing flattening treatment using the CMP method or the like. The third concave portion forming step is similar to the first concave portion forming step S12. The fifth convex portion forming step is similar to the first convex portion forming step. The second lens surface forming step is similar to the lens surface forming step S14. The second lens layer forming step is similar to the lens layer forming step S15. The second protective layer forming step is similar to the protective layer forming step S16.

When the insulating layer 36 is formed on the protective layer 23 as illustrated in FIG. 22, a third portion 364 having a shape following the shape of the second convex portion 52 and a fourth portion 365 having a shape following the shape of the third convex portion 53 are formed on the surface of the insulating layer 36 on the +z-axis side. In other words, the third portion 364 reflecting the film thickness of the second convex portion 52 is formed in a planar shape similar to that of the second convex portion 52, and the fourth portion 365 reflecting the film thickness of the third convex portion 53 is formed in a planar shape similar to that of the third convex portion 53.

The third concave portion 361 is formed such that a mask for exposure is disposed with respect to the fourth portion 365 to relatively position the third concave portion 361 with respect to the first concave portion 211 in plan view. Although not illustrated in the drawings, a second reference convex portion having the same structure as that of the reference convex portion 60 may be provided on the insulating layer 36 to position the third concave portion 361 with respect to the second reference convex portion.

The fifth convex portion 55 is formed on the bottom of the fourth concave portion 363 to determine a relative position of the fifth convex portion 55 with respect to the fourth concave portion 363. The second lens surface 362 is formed such that a mask for exposure is disposed with respect to the fifth convex portion 55 to determine a position of each of the plurality of second lens surfaces 362 with respect to the third concave portion 361. Accordingly, relative positions in plan view of the plurality of second lens surfaces 362 with respect to the plurality of lens surfaces 212 are determined.

As illustrated in FIG. 23, the third portion 364 and the fourth portion 365 are removed by flattening treatment performed when the second lens layer 37 is formed.

Even when the plurality of lens surfaces 212 and the plurality of second lens surfaces 362 are provided as described above, providing the position adjustment portion 5A enables determining a relative positional relationship between the lens surfaces 212 and the second lens surfaces 362 in plan view with high accuracy. Thus, positional displacement from each other in plan view of the lens surfaces 212, the second lens surfaces 362, the light transmitting portion A11, and the pixel electrode 28, can be reduced.

1-3. Third Embodiment

Figure 24:
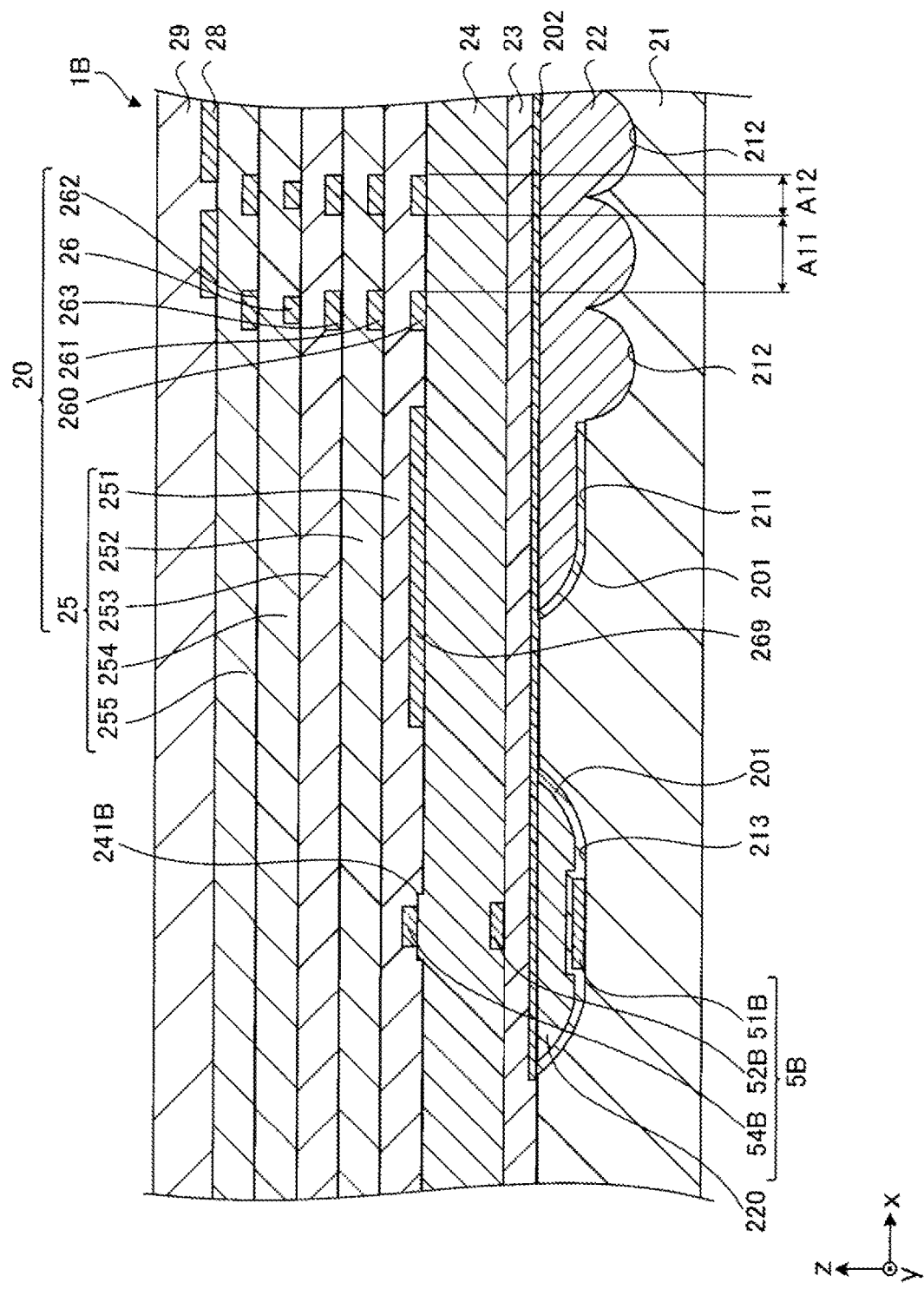
FIG. 24 is a schematic cross-sectional diagram illustrating a configuration of an element substrate according to a third embodiment.

Next, a third embodiment of the present disclosure will be described. FIG. 24 is a schematic cross-sectional diagram illustrating structure of an element substrate 1B according to the third embodiment. The present embodiment is different from the first embodiment in structure of a position adjustment portion 5B. In the third embodiment, detailed description of each of the same matters as those of the first embodiment will be appropriately eliminated by using the reference signs used in the description of the first embodiment.

The element substrate 1B illustrated in FIG. 24 includes the position adjustment portion 5B having a first convex portion 51B, a second convex portion 52B, and a fourth convex portion 54B, in which the third convex portion 53 according to the first embodiment is eliminated. In the present embodiment, the first convex portion 51B, the second convex portion 52B, and the fourth convex portion 54B overlap with each other in plan view. Each of the first convex portion 51B and the second convex portion 52B has a planar shape larger than that of the first embodiment. The optical path adjustment layer 24 includes a first portion 241B that is larger than that of the first embodiment. When a contour of each of the first convex portion 51B, the second convex portion 52B, and the first portion 241B can be easily grasped, the third convex portion 53 can be eliminated and the second convex portion 52B and the fourth convex portion 54B can be formed on the first portion 241B.

Even the present embodiment enables one light transmitting portion A11 to overlap with one of the lens surfaces 212 in plan view with high accuracy by using the position adjustment portion 5B. Thus, utilization efficiency of the light LL of the element substrate 1 can be increased.

2. Electronic Apparatus

The electro-optical device 100 can be used for various types of electronic apparatus.

Figure 25:
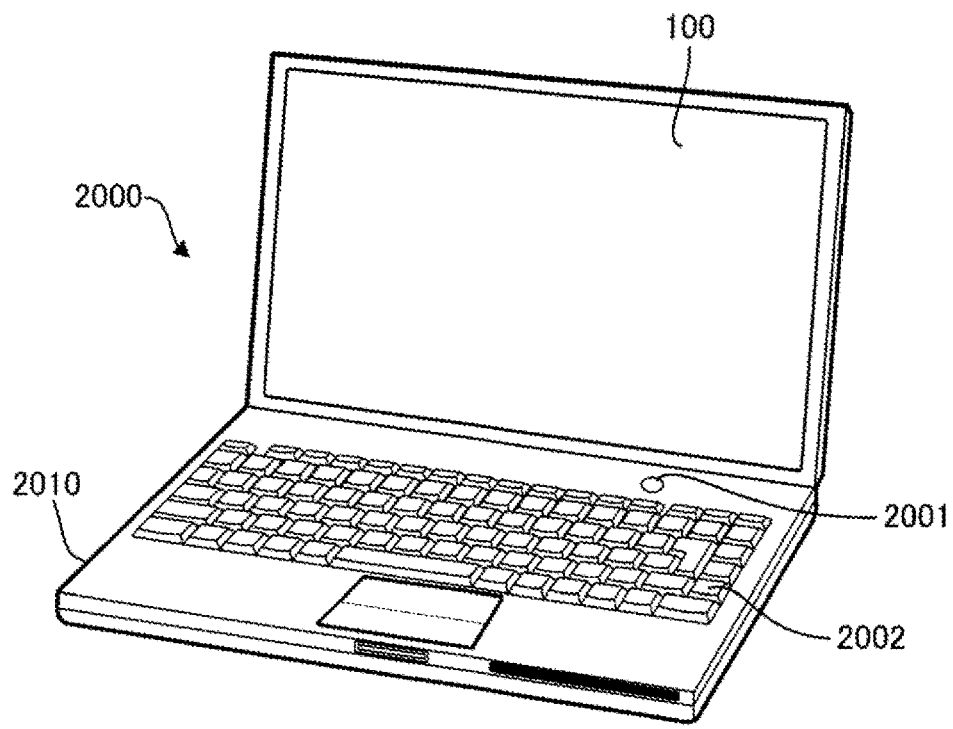
FIG. 25 is a perspective diagram illustrating a personal computer as an example of an electronic device.

FIG. 25 is a perspective diagram illustrating a personal computer 2000 as an example of the electronic apparatus. The personal computer 2000 includes an electro-optical device 100 configured to display various images, and a body unit 2010 in which a power source switch 2001 and a keyboard 2002 are installed.

Figure 26:
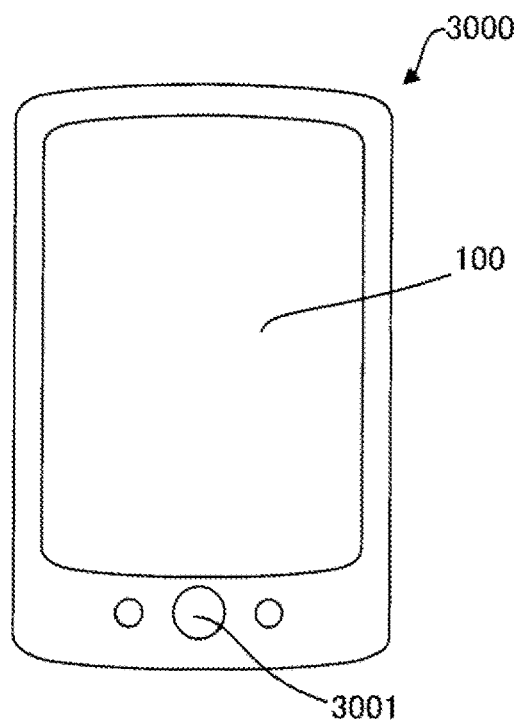
FIG. 26 is a perspective diagram illustrating a smart phone as an example of the electronic device.

FIG. 26 is a perspective diagram illustrating a smartphone 3000 as an example of the electronic apparatus. The smartphone 3000 includes an operation button 3001, and an electro-optical device 100 configured to display various images. Screen contents displayed on the electro-optical device 100 are changed in accordance with operation of the operation button 3001.

Figure 27:
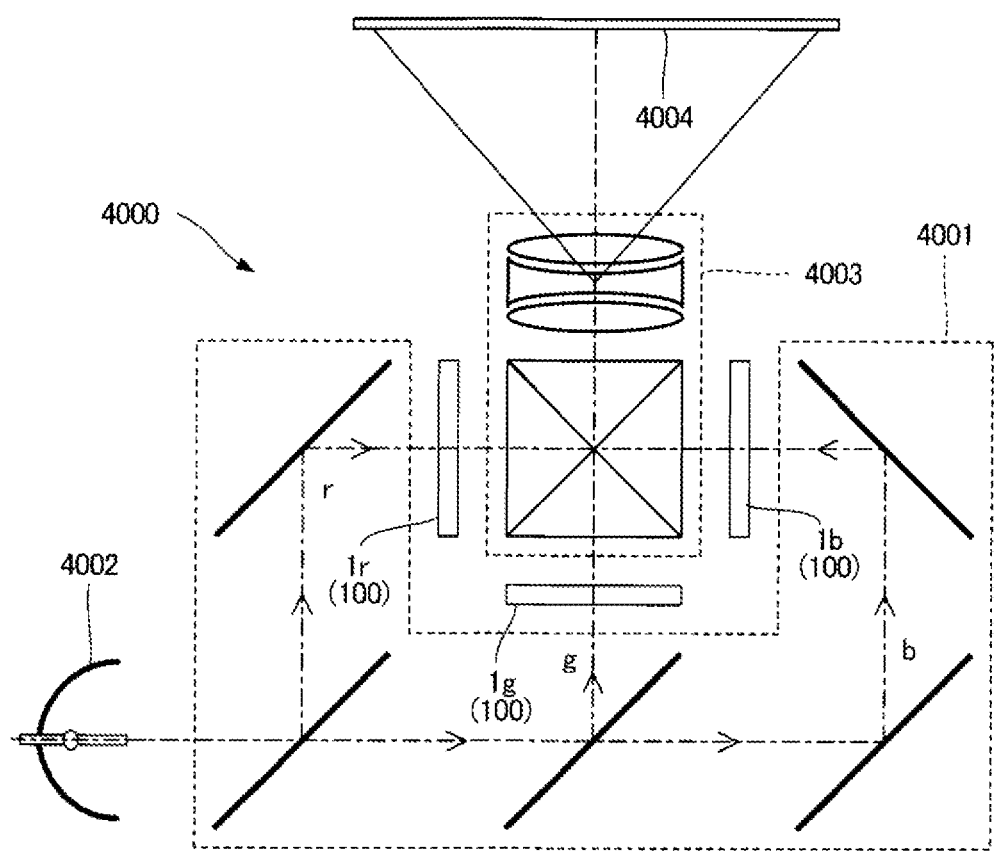
FIG. 27 is a schematic diagram illustrating a projector as an example of the electronic device.

FIG. 27 is a schematic diagram illustrating a projector as an example of the electronic apparatus. A projection-type display device 4000 is a three-plate type projector, for example. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. In other words, the projection-type display device 4000 includes the three electro-optical devices 1r, 1g, and 1b that respectively correspond to display colors of red, green, and blue.

An illumination optical system 4001 supplies a red element r of light emitted from an illumination device 4002 as a light source to the electro-optical device 1r, a green element g of the light to the electro-optical device 1g, and a blue element b of the light to the electro-optical device 1b. Each of the electro-optical devices 1r, 1g, and 1b functions as an optical modulator, such as a light bulb that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

The personal computer 2000, the smartphone 3000, and the projection-type display apparatus 4000 each include the above-described electro-optical device 100. Providing the electro-optical device 100 enables enhancing display uniformity of the personal computer 2000, the smartphone 3000, and the projection-type display apparatus 4000. Thus, the personal computer 2000, the smartphone 3000, and the projection-type display apparatus 4000 can be increased in quality.

Examples of the electronic apparatus to which the electro-optical device of the present disclosure is applied are not limited to those illustrated above, and include a personal digital assistants (PDA), a digital still camera, a television, a video camera, a car navigation device, an on-vehicle display, an electronic organizer, an electronic paper, an electronic calculator, a word processor, a workstation, a videophone, a point of sale (POS) terminal, and the like, for example. Other examples of the electronic apparatus to which the electro-optical device of the present disclosure is applied include a printer, a scanner, a copier, a video player, and a device provided with a touch panel, and the like.

While the present disclosure is described above based on the preferred embodiments, the present disclosure is not limited to the embodiments described above. In addition, the structure of each component of the present disclosure may be replaced with any structure that exerts the equivalent functions of the above-described embodiments, and to which any structure may be added.

While in the description described above, a liquid crystal display device is described as an example of the electro-optical device of the present disclosure, the electro-optical device of the present disclosure is not limited thereto. Specifically, the present disclosure may be applied to an electro-optical device having optical characteristic that varies in accordance with electrical energy. For example, the present disclosure can also be applied to a display panel using light-emitting devices such as organic electro luminescent (EL) devices, inorganic EL devices, and light-emitting polymers, similarly to the embodiments described above. In addition, the present disclosure can also be applied to an electrophoretic display panel that uses micro capsules each including colored liquid and white particles distributed in the liquid, similarly to the embodiments described above.

While in the description above, an example of the switching element is a TFT, the switching element is not limited thereto, and may be a metal-oxide-semiconductor field-effect transistor (MOSFET) or the like, for example.

What is claimed is:

1. An electro-optical device comprising:
   a transmissive substrate including a lens surface having a concave curved surface shape;
   a transmissive lens layer disposed at the substrate and in contact with the lens surface;
   an optical path adjustment layer disposed on an opposite side of the lens layer from the lens surface and configured to adjust an optical path length of light passing through the lens surface;
   a wiring layer including a transmissive light transmitting portion and a wiring portion that includes wiring disposed around the light transmitting portion in plan view from a thickness direction of the substrate, the wiring layer being disposed in contact with the optical path adjustment layer on an opposite side of the optical path adjustment layer from the lens layer;
   a transmissive pixel electrode disposed on an opposite side of the wiring layer from the optical path adjustment layer, the pixel electrode overlapping the light transmitting portion in plan view and being electrically coupled to the wiring;
   a first mark disposed between the substrate and the optical path adjustment layer and being in contact with the substrate;
   a second mark disposed between the optical path adjustment layer and the wiring layer and being in contact with the optical path adjustment layer; and
   a transmissive protective layer disposed between the lens layer and the optical path adjustment layer and configured to protect the lens layer, wherein
   a third mark is disposed on the optical path adjustment layer side of the protective layer and is in contact with the protective layer.

2. The electro-optical device according to claim 1, wherein
   the substrate includes a first concave portion, and the lens surface is provided at a bottom surface of the first concave portion.

3. The electro-optical device according to claim 1, wherein
   a thickness of the optical path adjustment layer is from 2 to 30 µm.

4. The electro-optical device according to claim 1, wherein
   a light transmittance of the first mark is lower than a light transmittance of the substrate, and
   a light transmittance of the second mark is lower than a light transmittance of the light transmitting portion.

5. The electro-optical device according to claim 4, wherein
   the first mark includes silicon or silicon oxynitride.

6. The electro-optical device according to claim 1, wherein
   the first mark protrudes from the substrate toward the optical path adjustment layer, and
   the second mark protrudes from the optical path adjustment layer toward the wiring layer.

7. The electro-optical device according to claim 1, wherein
   the substrate includes a second concave portion provided at a surface of the substrate on the lens layer side, and
   the first mark is disposed at the second concave portion.

8. The electro-optical device according to claim 1, wherein
   the third mark overlaps the first mark in plan view.

9. A method for manufacturing an electro-optical device, the method comprising:
   forming a first mark in contact with a transmissive substrate;
   forming a lens surface having a concave curved surface shape at a surface side of the substrate at which the first mark is formed;
   forming a transmissive lens layer on the lens surface;
   forming an optical path adjustment layer on an opposite side of the lens layer from the lens surface, the optical path adjustment layer being configured to adjust an optical path length of light passing through the lens surface;
   forming a wiring layer including a light transmitting portion through which light passes, and a wiring portion that includes wiring disposed around the light transmitting portion in plan view from a thickness direction of the substrate, the wiring layer being formed on an opposite side of the optical path adjustment layer from the lens layer and being in contact with the optical path adjustment layer;
   forming a second mark in contact with the optical path adjustment layer on an opposite side of the optical path adjustment layer from the substrate;
   forming a transmissive pixel electrode on an opposite side of the wiring layer from the optical path adjustment layer, the pixel electrode overlapping the light transmitting portion in plan view and being electrically coupled to the wiring;
   forming a transmissive protective layer between the lens layer and the optical path adjustment layer and configured to protect the lens layer; and
   forming a third mark on the optical path adjustment layer side of the protective layer and in contact with the protective layer.

10. A member for manufacturing an electro-optical device, the member comprising:
- a transmissive substrate including a first surface, a second surface, and a side surface connecting the first surface and the second surface, and a lens surface at the first surface;
- a transmissive lens layer disposed at the first surface and in contact with the lens surface;
- an optical path adjustment layer disposed on an opposite side of the lens layer from the lens surface and configured to adjust an optical path length of light passing through the lens surface;
- a wiring layer including a transmissive light transmitting portion and a wiring portion that includes wiring disposed around the light transmitting portion in plan view from a thickness direction of the substrate, the wiring layer being disposed in contact with the optical path adjustment layer on an opposite side of the optical path adjustment layer from the lens layer;
- a transmissive pixel electrode disposed on an opposite side of the wiring layer from the optical path adjustment layer, the pixel electrode overlapping the light transmitting portion in plan view and being electrically coupled to the wiring;
- a first mark disposed between the substrate and the optical path adjustment layer and being in contact with the substrate;
- a second mark disposed between the optical path adjustment layer and the wiring layer and being in contact with the optical path adjustment layer;
- a transmissive protective layer disposed between the lens layer and the optical path adjustment layer and configured to protect the lens layer; and
- a third mark is disposed on the optical path adjustment layer side of the protective layer and in contact with the protective layer.

* * * * *